(12) United States Patent
Globerman et al.

(10) Patent No.: US 12,662,242 B2
(45) Date of Patent: Jun. 23, 2026

(54) SYSTEM, ASSEMBLIES AND METHODS FOR MECHANICAL-THRUST POWER CONVERSION MULTIFANS

(71) Applicant: N.M.B. MEDICAL APPLICATIONS LTD, Herzliya (IL)

(72) Inventors: Oren Globerman, Kfar Shmaryahu (IL); Mordechay Beyar, Tel Aviv (IL)

(73) Assignee: N.M.B MEDICAL APPLICATIONS LTD, Herzliya (IL)

( * ) Notice: Subject to any disclaimer, the term of this patent is extended or adjusted under 35 U.S.C. 154(b) by 126 days.

(21) Appl. No.: 18/391,882

(22) Filed: Dec. 21, 2023

(65) Prior Publication Data

US 2024/0158073 A1 May 16, 2024

Related U.S. Application Data

(63) Continuation-in-part of application No. 17/242,344, filed on Apr. 28, 2021, now Pat. No. 11,884,386, which is a continuation of application No. 16/068,920, filed as application No.
(Continued)

(51) Int. Cl.
| | |
|---|---|
| *B64C 27/10* | (2023.01) |
| *B64C 11/48* | (2006.01) |
| *B64C 29/00* | (2006.01) |
| *B64C 27/20* | (2023.01) |

(52) U.S. Cl.
CPC .............. *B64C 27/10* (2013.01); *B64C 11/48* (2013.01); *B64C 29/0033* (2013.01); *B64C 27/20* (2013.01)

(58) Field of Classification Search
CPC ...................................................... B64C 11/48
See application file for complete search history.

(56) References Cited

U.S. PATENT DOCUMENTS

| | | | |
|---|---|---|---|
| 2,382,460 | A | 8/1945 | Middleton |
| 2,383,460 | A | 8/1945 | Young |
| 3,034,747 | A | 5/1962 | Lent |

(Continued)

FOREIGN PATENT DOCUMENTS

| | | |
|---|---|---|
| CN | 101693146 | 4/2010 |
| CN | 102114914 | 7/2011 |

(Continued)

OTHER PUBLICATIONS

Brungart et al.; Quadcopter Propeller Noise and its Control, PennState Applied Research Laboratory, May 15, 2019.
(Continued)

*Primary Examiner* — Juan G Flores
(74) *Attorney, Agent, or Firm* — PEARL COHEN ZEDEK LATZER BARATZ LLP

(57) ABSTRACT

A multi-rotor system for providing air thrust is disclosed comprising at least one multi-rotor assembly. The multi-rotor assembly comprising at least two rotors rotatable about a common axis wherein the outer radius of a first rotor is substantially similar to the inner radius of the second rotor. An airborne vehicle is also disclosed that is adapted to perform vertical takeoff and landing (VTOL). The airborne vehicle comprising at least two multi-rotor system disposed substantially symmetrically around the center of gravity of the vehicle.

7 Claims, 19 Drawing Sheets

Related U.S. Application Data

PCT/IL2017/050069 on Jan. 18, 2017, now Pat. No. 11,046,426.

(60) Provisional application No. 62/280,762, filed on Jan. 20, 2016.

(56) References Cited

U.S. PATENT DOCUMENTS

| | | | |
|---|---|---|---|
| 3,813,059 | A | 5/1974 | Jefferson |
| 3,838,835 | A | 10/1974 | Kling |
| 4,088,352 | A | 5/1978 | Kling |
| 5,213,284 | A | 5/1993 | Webster |
| 5,454,695 | A | 10/1995 | Shah et al. |
| 8,464,978 | B2 | 6/2013 | Yim |
| 10,486,835 | B2 | 11/2019 | Crowe |
| 2005/0067527 | A1 | 3/2005 | Petersen |
| 2006/0226281 | A1 | 10/2006 | Walton |
| 2009/0250549 | A1 | 10/2009 | Wiggerich |
| 2010/0111697 | A1 | 5/2010 | Wood |
| 2010/0264256 | A1 | 10/2010 | Yim |
| 2015/0159628 | A1 | 6/2015 | Appa |
| 2016/0311526 | A1 | 10/2016 | Geise et al. |
| 2016/0375983 | A1 | 12/2016 | Yan |
| 2018/0057135 | A1 | 3/2018 | Yan |
| 2019/0002096 | A1* | 1/2019 | Chan ..................... B64C 27/467 |
| 2019/0225327 | A1 | 7/2019 | Kidakarn |
| 2023/0002042 | A1* | 1/2023 | Karem .................. B64C 11/305 |

FOREIGN PATENT DOCUMENTS

| | | |
|---|---|---|
| CN | 202431446 | 9/2012 |
| CN | 104787315 | 7/2015 |
| CN | 104859851 | 8/2015 |
| CN | 105270616 | 1/2016 |
| CN | 205168889 | 4/2016 |
| CN | 205256663 | 5/2016 |
| CN | 105984581 | 10/2016 |
| DE | 20 2005 019243 | 2/2006 |
| DE | 102005058805 | 6/2007 |
| FR | 1 412 515 | 10/1965 |
| GB | 460781 | 2/1937 |
| GB | 1 386 335 | 3/1975 |
| JP | 2004121798 | 4/2004 |
| WO | WO 2015145101 | 10/2015 |

OTHER PUBLICATIONS

Grande et al.; Aeroacoustic Investigation of a Propeller Operating at Low Reynolds Numbers; AIAA Journal, vol. 60, pp. 860-887, No. 2, Feb. 2022.

* cited by examiner $$V_{TANG\ INNER\ (1 \le i \le 4)} = \frac{V_{TANG\ MAX} * R_{i+1}}{R_i}$$

302   304   306   308   310

302A   304A   306A   308A   310A 302B   304B   306B   308B   310B

300

300A

406

404

402

410A

410B

410C

400

700

704

702

703

AA

AA

701

AIR FLOW 702    704
706    706A
708    708A
BB    BB
702A    704A

CROSS SECTION AA

704    α
704A    β

CROSS SECTION BB

1000

SECTION A-A

1100

1112

1120

1110

1100

SECTION A-A

1112

1132 { 1132a
       1132b

1134c

1134 { 1134a
       1134b

1136c

1136 { 1136a
       1136b

1110d 1122a    1122b

1114

1124a    1124b

1116

1126a

1126b

1120

1122

1124

1126

1110

Controller    1140

1200

1200

SECTION A-A

SYSTEM, ASSEMBLIES AND METHODS FOR MECHANICAL-THRUST POWER CONVERSION MULTIFANS

CROSS-REFERENCE TO RELATED APPLICATIONS

This application is a continuation-in-part application of U.S. patent application Ser. No. 17/242,344 filed on Apr. 28, 2021, which is a continuation of U.S. patent application Ser. No. 16/068,920 filed Jul. 10, 2018 and granted as U.S. Pat. No. 11,046,426 on Jun. 29, 2021, which is a National Phase Application of PCT International Application No. PCT/IL2017/050069, International Filing Date Jan. 18, 2017, which claims the benefit of U.S. Provisional Patent Application No. 62/280,762 filed on Jan. 20, 2016, all of which are hereby incorporated by reference in their entirety.

BACKGROUND OF THE INVENTION

Methods and means for providing thrust in fluidic environment such as in the air are known for many years and include various types of propellers, fans, jet engines, rocket engines and the like. Similarly, methods and means for converting flow of fluidic material, such as air, to mechanical/electrical energy are also known for many years and comprise wind turbines, wave/tide energy conversion systems, and the like. Means and methods for providing thrust for an object in air, for providing forward/sideways forces or for providing lift forces, such as in helicopters or similar vertical takeoff and landing (VTOL) vehicles, are also known.

The efficiency of such means and methods may be measured, basically, by the ratio between the resulting effective thrust energy/power and the mechanical/electrical energy/power entered into the converting means. Similarly, in means for converting flow of fluids into mechanical/electrical energy the ratio measuring the efficiency will be between the resulting mechanical/electrical energy/power and the fluids energy/power given to the conversion means.

Typically, reduction of the efficiency may result from mechanical friction, from fluidic turbulences resulting non-consumable energy loss, fluidics energy converted to noise, mechanical vibrations, etc.

Additional efficiency factor may be the efficiency of exploitation of area, space and related physical dimensions. For example, the thrust provided by a propeller or helicopter rotor is different in different areas of the propeller/rotor. FIGS. 1A-1C schematically present helicopter 100 in top and side views and a graph of the helicopter's rotor aerodynamic performance, respectively, as known in the art. Rotor 102 of helicopter 100 may be rotated in a rotation speed that is limited by the tangential speed of the rotor's blade tips, $VR_T$, that should not exceed the speed of sound, and practically not exceed 0.85 of the speed of sound. While the rotor blade tip tangential speed may be close to, and may not exceed the speed of sound, the tangential speed of points along the rotor blade, vary from zero at the axis of rotation, and increases linearly with the radius towards the rotor's blade tip. The aerodynamic efficiency of rotating blades decreases as their linear (=tangential) speed decreases or as their linear speed approaches the speed of sound due to the abrupt change in the density of the air. The area of rotor 102 may be divided, roughly, into two concentric zones 107 and 108. Zone 107 is the external zone, defined between circle 104, depicting the path of the rotor blades' tips and circle 106. Zone 108 is the internal zone defined inside circle 106.

As the tangential speed of points along the rotor's blades reduces, the aerodynamic lift of the blade at such points reduces until, at points along circle 106, the lift of the blade there is smaller than the aerodynamic drag produced at that point, as is depicted in FIG. 1C, where graph 110 describe the aerodynamic lift at points along the blade and graph 112 describes the aerodynamic drag produced by the rotor's rotating blades. It may be seen that the drag produced by the rotor's blades is substantially constant with the location along the blade, while the aerodynamic lift drops sharply at points located along circle 106. The efficiency of such thrust producing means may, thus, be defined as the ration of the area usable for producing lift to the total area exploited by the thrust producing means. For example, if the radius of circle 106 is ⅔ of the radius of the blade's tip 104, the Rotor area (s) Efficiency ratio $RE_S$, will be:

$$RE_S = \frac{\pi(R1^2 - R2^2)}{\pi R1^2} = \frac{R1^2 - \left(\frac{2}{3}R1\right)^2}{R1^2} = \frac{5}{9} = 0.55$$

Generally speaking the thrust obtainable from a rotating rotor is proportional to the square of the linear speed of a given part of the rotor's blade, thus the linear speed of the rotor's blades has a large impact on the obtainable thrust of a rotor. Further, noise caused by the rotation of a rotor or a propeller is mainly due to air shear caused by neighboring/adjacent air flows having different air flow speeds. Therefore obtaining a given total thrust from a rotor system where the difference in airspeeds of adjacent airflows is lower will reduce the noise caused by that rotor.

It would be beneficial to improve the rotor area efficiency figure, and even more beneficial to improve this efficiency factor while improving, or at least not diminishing other aspects of the overall performance figures, such as lower self-weight, reduced noise losses, etc. Improvement of the efficiency of a rotor/propeller may also reduce the noise it produces during operation, which mainly results from non-laminar flow induced by the rotor/propeller. Thus, reduction of non-laminar flow of fluid through the rotor/propeller, by means of slowing the speed of the blades' tips, by controlling and directing the fluid's flow before and after the rotor/propeller and the like, may increase the useful thrust while reducing the produced noise.

SUMMARY OF THE INVENTION

A multi-rotor system for providing air thrust is disclosed comprising at least one multi-rotor assembly. The multi-rotor assembly comprising at least two rotors rotatable about a common axis wherein the outer radius of a first rotor, is substantially similar to the inner radius of the second rotor.

According to some embodiments of the invention the multi-rotor system further comprising driving means adapted to rotate each of the rotors in a rotational speed independent of the rotational speed of the other rotors.

According to some embodiments of the invention the at least two rotors are disposed and rotatable in a common plane.

According to some embodiments of the invention the multi-rotor system further comprising duct disposed closely around the outer radius of the out-most rotor and directed with its air flow direction coaxially with the common axis of the multi-rotor system. The multi-rotor system may further comprise at least one additional air duct disposed closely around outer radius of one other rotor.

According to yet additional embodiments an airborne vehicle is disclosed that is adapted to perform vertical takeoff and landing (VTOL). The airborne vehicle comprising at least two multi-rotor system disposed substantially symmetrically around the center of gravity of the vehicle. Each multi-rotor system comprising at least two rotors rotatable about a common axis wherein the outer radius of a first rotor, is substantially similar to the inner radius of the second rotor, and driving means adapted to rotate each of the rotors in a rotational speed independent of the rotational speed of the other rotors.

According to embodiments of the invention the airborne VTOL vehicle is adapted to provide vertical thrust when in takeoff and in landing maneuvering and is further adapted to provide horizontal thrust when in flight maneuvering.

Some embodiments of the present invention may provide a multi-rotor system which may include: at least two concentric rotors rotatable about a common axis and disposed axially with respect to each other; wherein blades of different rotors of the at least two concentric rotors have the same inner radius and different outer radiuses; wherein the at least two concentric rotors are rotatable at different angular speeds with respect to each other, and wherein the angular speeds of the at least two concentric rotors are set so as to rotate blade tips of the at least two rotor rotors at substantially the same tangential speed.

In some embodiments, the tangential speed of the rotor blade tips of the at least two concentric rotors is a maximal practical tangential speed for an operational profile of the multi-rotor system.

In some embodiments, a speed of the blade tips of the at least two rotor rotors relative to the air is 0.2 Mach or less.

In some embodiments, the at least two concentric rotors are rotatable in the same direction.

Some embodiments of the present invention may provide an airborne vehicle adapted to perform vertical takeoff and landing (VTOL) which may include at least two multi-rotor systems, wherein each of the at least two multi-rotor systems is as described above.

In some embodiments, at least one multi-rotor system of the at least two multi-rotor systems is adapted to be tilted between a first position in which the at least one multi-rotor system provides mainly horizontal thrust and a second position in which the at least one multi-rotor system provides mainly vertical thrust.

In some embodiments, at least one of the at least two multi-rotor systems is adapted to provide mainly horizontal thrust when in flight maneuvering.

Some embodiments of the present invention may provide a multi-rotor system which may include: at least two concentric rotors rotatable about a common axis and disposed radially with respect to each other, wherein the at least two concentric rotors are rotatable at different angular speeds with respect to each other; and wherein the angular speeds of the at least two concentric rotors are set so as to rotate blade tips of the at least two concentric rotors at a speed of 0.2 Mach or less relative to the air.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figures 1A, 1B, 1C:
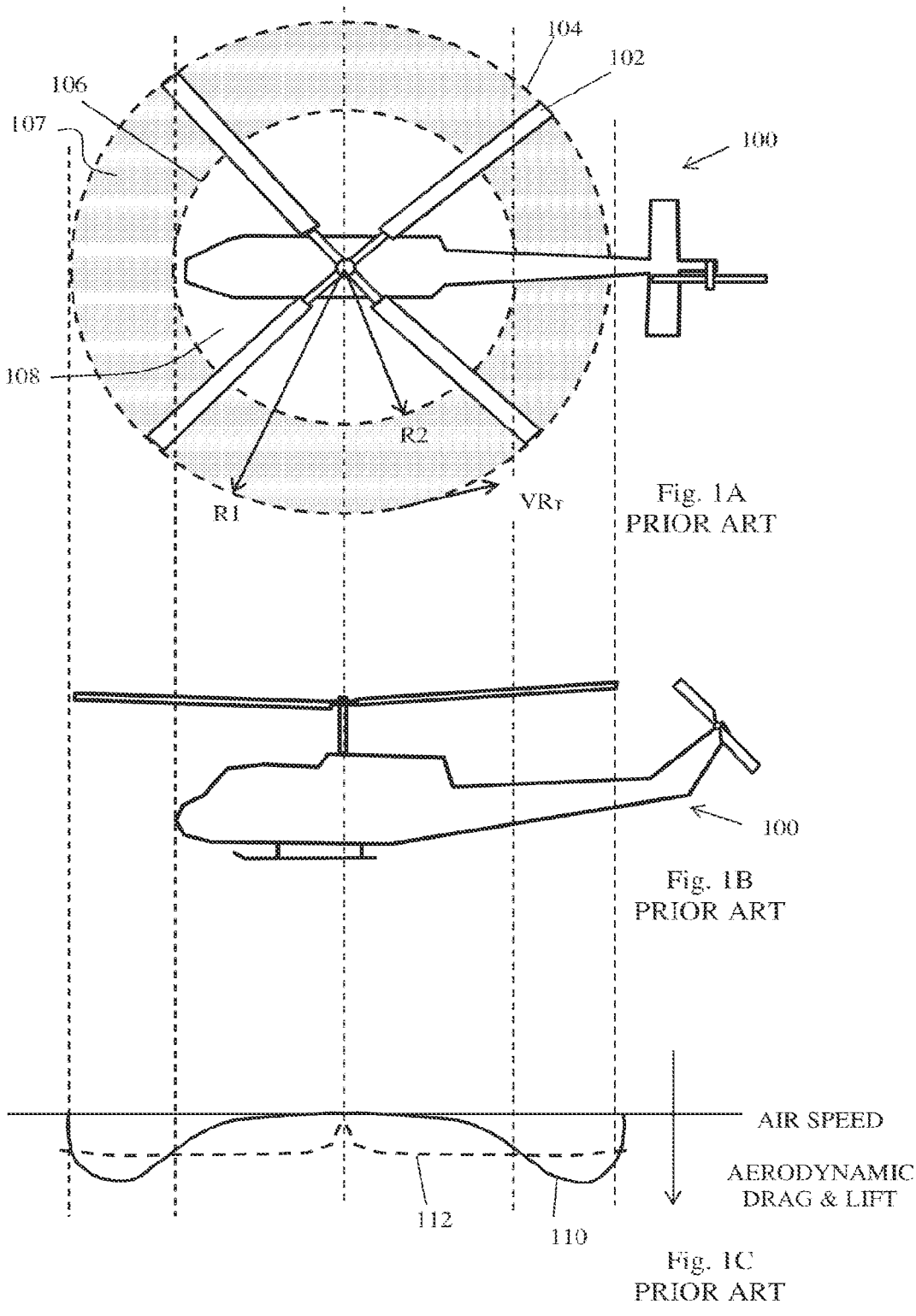
FIGS. 1A-IC schematically present an helicopter in top and side views and a graph of the helicopter's rotor aerodynamic performance, respectively.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figures 2A, 2B:
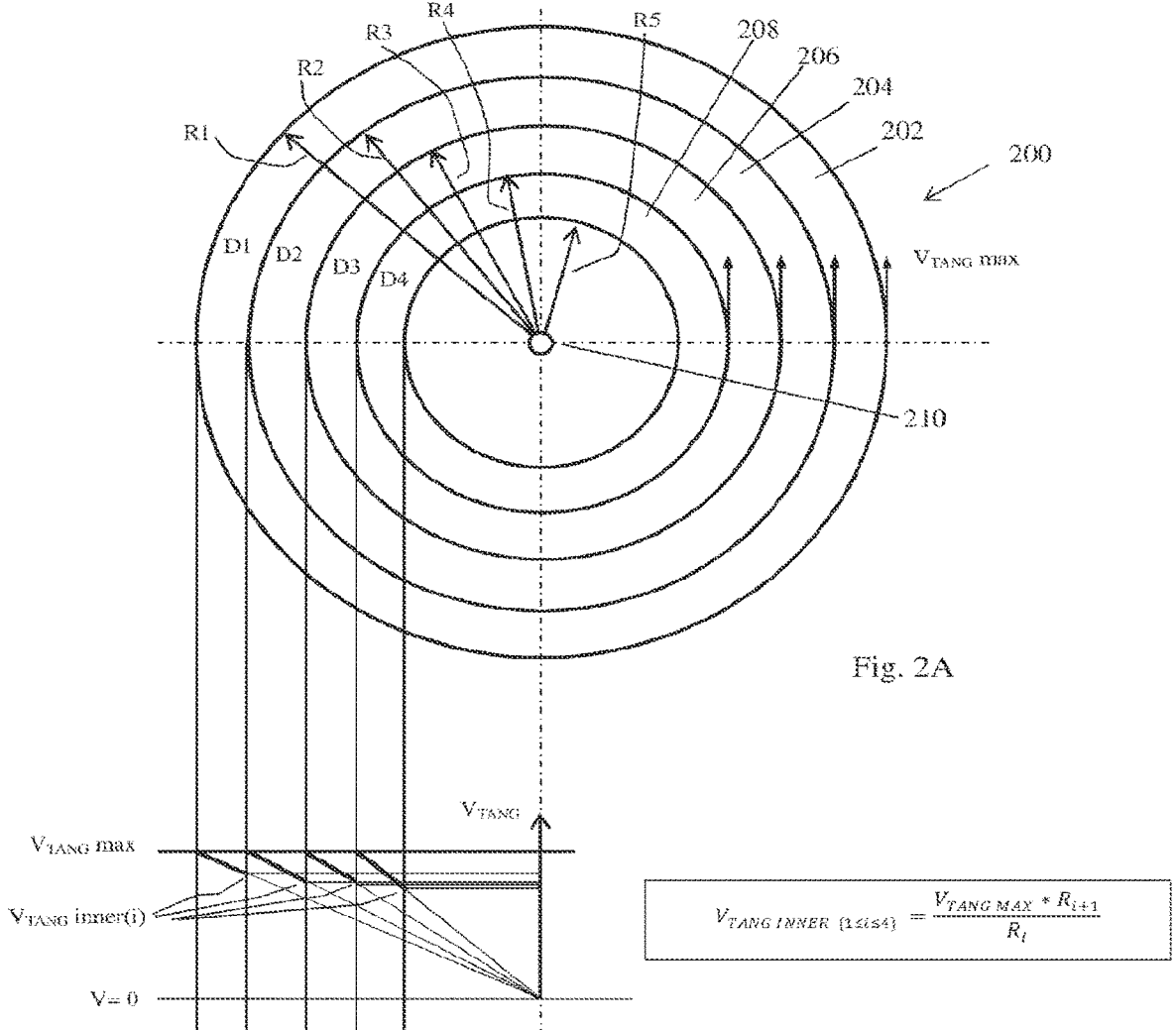
FIGS. 2A and 2B schematically depict a coaxial multi-rotor system and a graph of the rotors' blades velocities of this system, respectively, according to embodiments of the present invention.

According to embodiments of the present invention two or more concentric rotors or propellers may be assembled, to operate about a common axis, substantially in a common plane, to provide, each, thrust in the same direction. Reference is made to FIGS. 2A and 2B, which schematically depict a coaxial multi-rotor system and a graph of the rotors' blades velocities of this system, respectively, according to embodiments of the present invention. Coaxial multi-rotor system 200 may comprise plurality of rotors 202, 204, 206 and 208 arranged to rotate about a common axis 210. The various rotors are assembled to operate substantially in a common plane in a way that flow through the multi-rotor system will not pass through more than one rotor and the gap between the rotors will be minimal, for example the outer radius of the blades of each rotor is designed to be only slightly shorter than the inner radius of the blades of the neighbor rotor having a longer radius. For example, the outer radius R2 of rotor 204 may be designed to be slightly shorter than the inner radius (not numbered) of rotor 202. This way a substantially continuous coverage of the disk of system 200 is provided by the plurality of rotors, between longest radius R1 and the most inner radius R5. The plurality of rotors may be rotated in different angular speeds. According to embodiments of the present invention the angular speed of each rotor may be that which will rotate the respective rotor blade tip in a tangential $V_{TANG}$ MAX speed which may be the maximal practical tangential speed for the operation profile of the rotor system, for example 0.85 of the speed of sound. As depicted in the graph of FIG. 2B, when each of the rotors 202, 204 etc. is set to $V_{TANG\ MAX}$, the tangential speed of the inner end of the blades of the rotors, $V_{TANG\ INNER(i)}$, is different, and is slower as the radius Ri ($1<i<5$) is shorter. It shall be apparent that according to embodiments of the present invention the specific rotational speeds of the rotors of system 200 may be set otherwise, for example so as to incur rotor's blade tip tangential speed to vary between the rotors, as the functionality of the rotor may dictate.

The length of the blades of each of the rotors 202, 204, etc. may be designed to achieve desired overall results. For example, the length of the rotors' blades may be the same for all of the rotors of system 200, for example to provide lower blades production costs. According to other embodiments the specific length of blades of each rotor may be designed to achieve optimal aerodynamic efficiency from rotors system 200. As opposed to a single-rotor system, where a substantial area of the rotor is aerodynamically inefficient, as presented in FIGS. 1A-1C, rotors system 200 presents higher utilization of the area occupied by the rotor. If, for example, in system 200, R5=0.2R1, the Rotor area (s) Efficiency ratio $RE_S$, will be:

$$1-(0.2)^2=0.96$$

Figure 3:
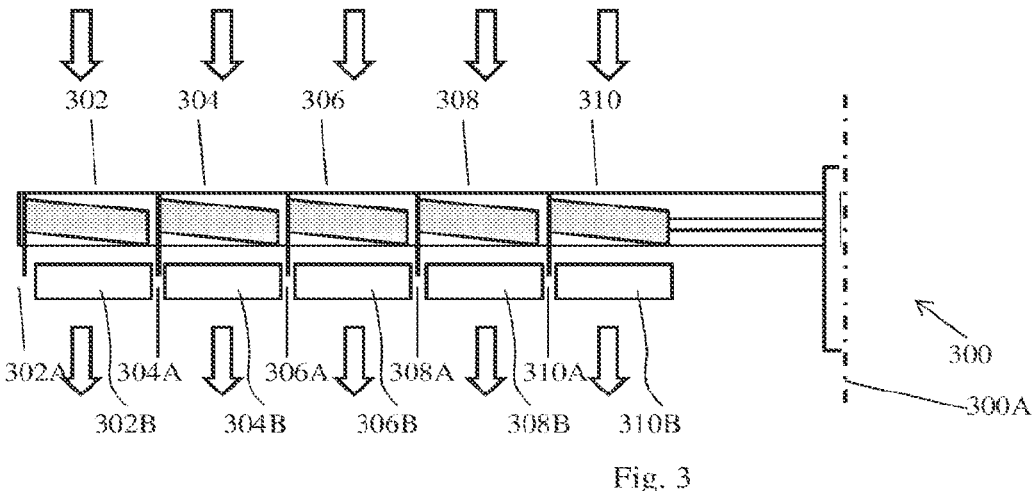
FIG. 3 schematically presents cross section through a coaxial multi-rotor system, showing only the left side of the cross section, which is symmetric about a symmetry line, according to embodiment of the present invention.

Reference is made now to FIG. 3, which schematically presents cross section through a coaxial multi-rotor system 300, showing only the left side of the cross section, which is symmetric about symmetry line 300A, according to embodiment of the present invention. Rotors 302, 304, 306, 308 and 310 may be substantially arranged in a common plane, perpendicular to the rotation axis, coinciding with line 300A. Each of the rotors' blades may have disposed around the outer end of the blades a rotor end ring 302A-310A, respectively, which may provide structural support as well as aerodynamic air directing means, to minimize the rotor's blade-end turbulences and provide improved laminar flow from the specific rotors of system 300. Providing stator flow guides stator structures 302B-310B may also reduce the noise produced by the multi rotor system by means of reduction of turbulences and other sources of noise production such as reduction of zones where flow of air of different velocities and/or different pressure meet each other.

Figure 4:
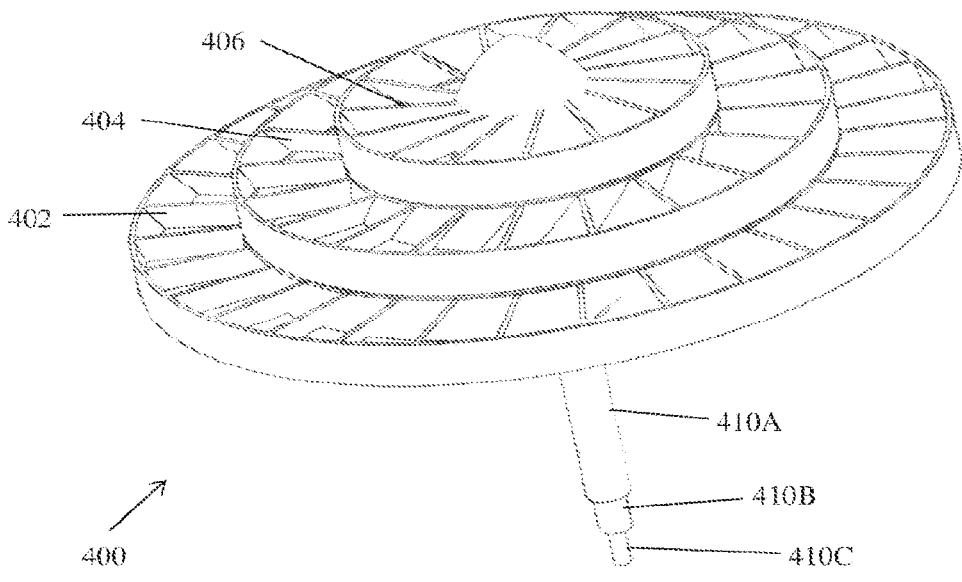
FIG. 4 schematically presents coaxial multi-rotor system according to embodiments of the present invention.

Reference is made now to FIG. 4, which schematically presents coaxial multi-rotor system 400, according to embodiments of the present invention. Rotors system 400 comprises three coaxial rotors 402, 404 and 406 arranged each in a defined plane, the defined planes are perpendicular to the axis of rotation of the rotors. Driving shafts 410A, 410B and 410C, mechanically attached to rotors 402, 404, and 406, respectively, and arranged inside each other. The shafts are tubes, except the most internal one, 410C that optionally can be solid rod. Each shaft attached at one side to rotor, and at the other side to motor or generator.

As discussed above, noise caused by the rotation of a rotor or a propeller is mainly due to air shear caused by neighboring/adjacent air flows having different air flow speeds. Therefore, in multi-rotor systems such as system 300 and system 400, a given total thrust is obtained such that the difference in airspeeds of adjacent airflows is lower compared to a single rotor/propeller providing the same thrust and thus the noise caused by that multi-rotor system is lower.

Figure 5:
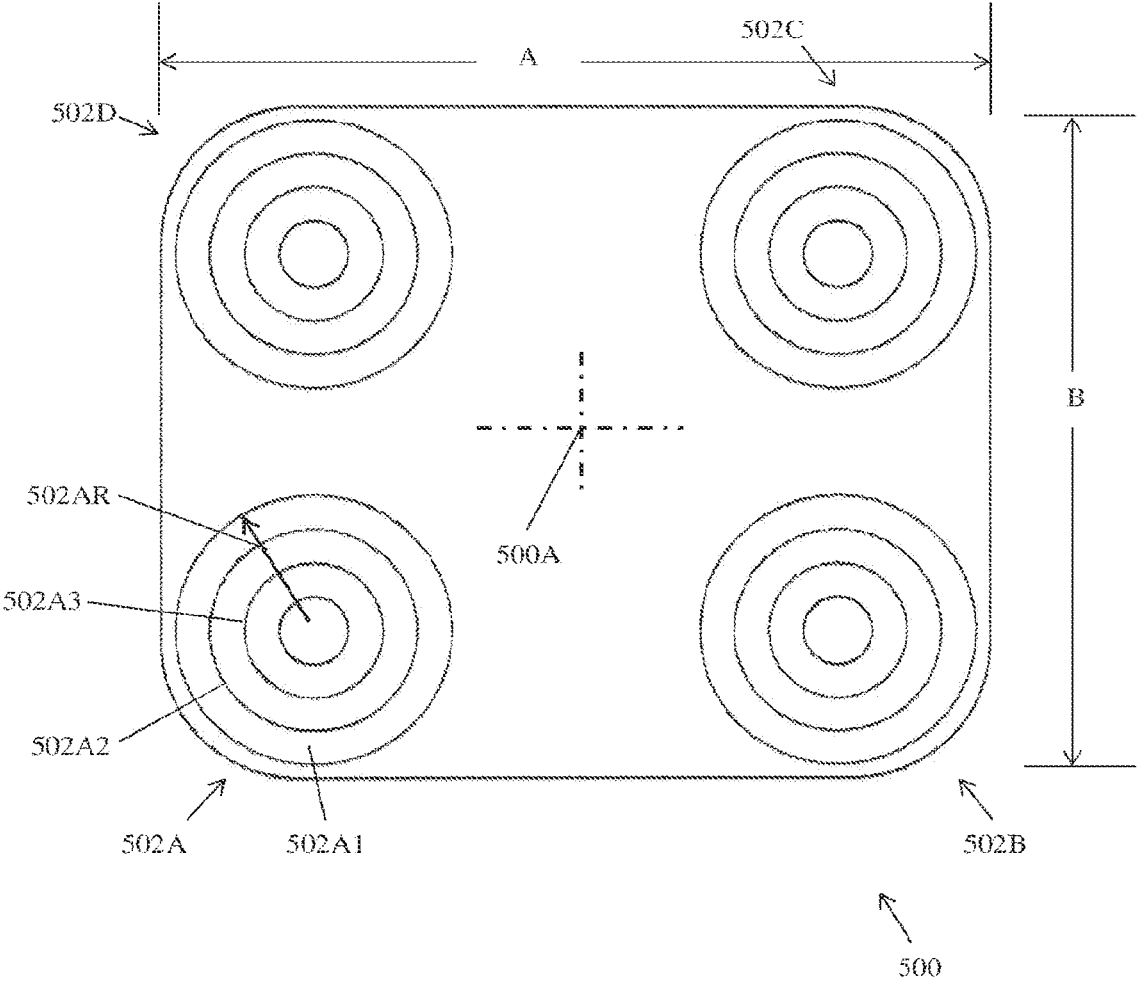
FIG. 5 schematically presents lift system comprising four coaxial multi-rotor systems, each comprising a plurality of coaxial rotors, according to embodiments of the present invention.

In accordance with embodiments of the present invention, and as is presented above, due to improved utilization of the rotors disc overall area, for a required given performance of a rotor (where performance is expressed by the lift force that may be provided by the rotor) a rotor system with outer radius that is substantially shorter than that of a single rotor with similar performance may be used. This provides further benefits, such as improved maneuvering ability due to quicker response to control commands (lower inertia) and due to better ability to operate close to obstacles, as well as operational benefits such as improved potential for mobility of the respective aircraft by other vehicles. According to some embodiments of the present invention, a lift providing system may comprise two or more coaxial multi-rotor systems. Reference is made to FIG. 5, which schematically presents lift system 500 comprising four coaxial multi-rotor systems 502A-502D, each comprising a plurality of coaxial rotors—three in the example of FIG. 5, according to embodiments of the present invention. Multi-rotors systems 502A-502D may be disposed for example symmetrically around center point 500A of lift system 500. The ratio between the outer radius 502AR of the plurality of multi-rotor systems 502A-502D and the outer dimensions A and B of the lift system 500 (in some embodiments A=B) may be designed to meet specific requirements. For example, multi-rotor systems 502A-502D may be disposed closer to each other to provide for smaller overall dimension of the aircraft using lift system 500. In other embodiments multi-rotor systems 502A-502D may be disposed farther from each other to provide for higher maneuvering moments. Lift systems such as system 500, having plurality of multi-rotor systems may also provide higher redundancy factor, which is a desired benefit since each rotor will be able to work independently.

Figure 6:
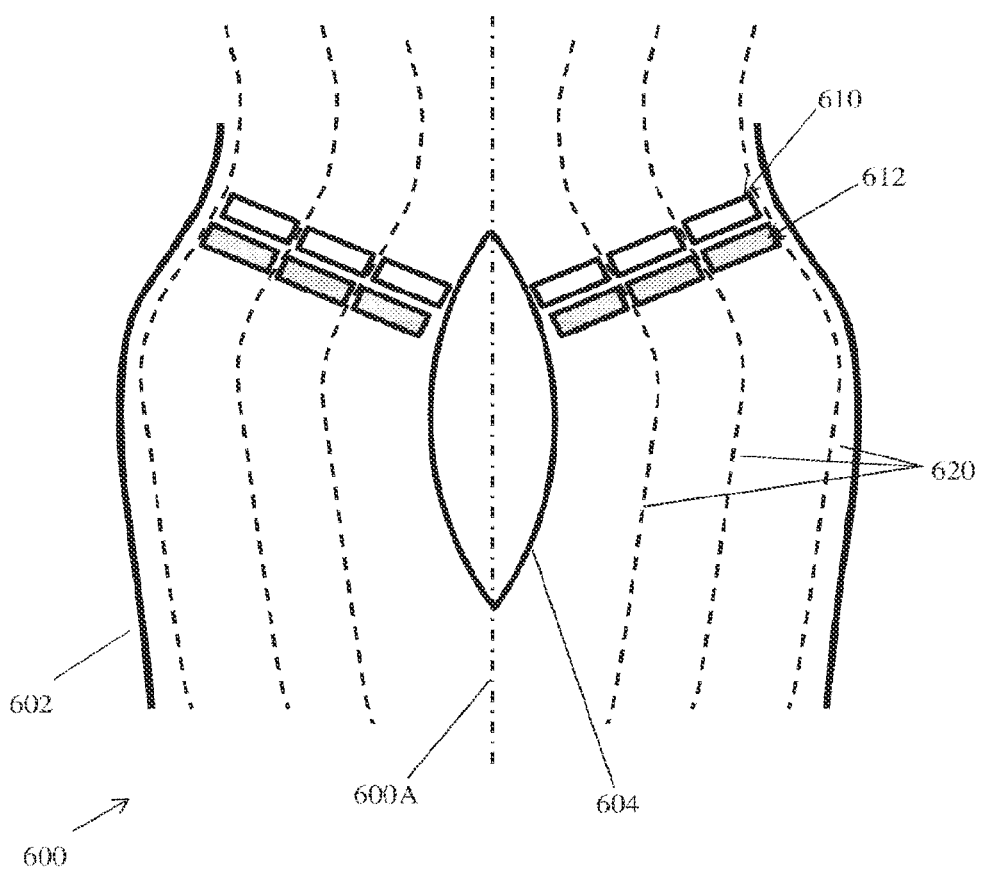
FIG. 6 is a schematic cross section in coaxial multi-rotor system according to embodiments of the present invention.

A multi-rotor system, such as system 200 or 300, may be disposed within, or equipped with an air guiding system which may comprise one or more air ducts and/or one or more air guiding fins, which may be static or moveable to provide changeable guiding angles. Reference is made now to FIG. 6, which is a schematic cross section in coaxial multi-rotor system 600, according to embodiments of the present invention. System 600 may comprise duct 602 comprising multi coaxial rotors 610. Three rotors are drawn in FIG. 6, however it would be apparent that other number of coaxial rotors may be used. Multi-rotor system 610 is disposed within duct 602, which is adapted to guide the air flowing to and from rotor system 610, for example in order to improve the aerodynamic efficiency of system 600, to reduce the noise produced during the operation of system 600, and the like. Multi-rotor system 610 may be configured to provide flow which is not parallel to the axis line (non-axial flow) and may further comprise core element 604 disposed along at least part of the central line 600A of system 600. Core 604 may comprise utilities such as rotational driving means (motors, gearboxes and the like), sensors and the like. According to some embodiments system 600 may further comprise air guiding fins 612 disposed adjacent to multi-rotor system 610 (down the air flow from the multi-rotor system in the drawn example). Air guiding fins 612 may be static or may be adapted to change their angle with respect to the direction the air flow so as to adaptively address changing conditions such as changes the of airspeed through the fins, changes in the turbulences downstream the rotors, etc. Flow lines 620 indicate imaginary lines along duct 602 from the inlet towards its outlet. Internal flow guiding elements may be disposed inside duct 602 to induce, or force improved laminar flow through duct 602. Such flow guiding means may be disposed, for example, along, or parallel to the imaginary flow lines.

Figures 7A, 7B, 7C:
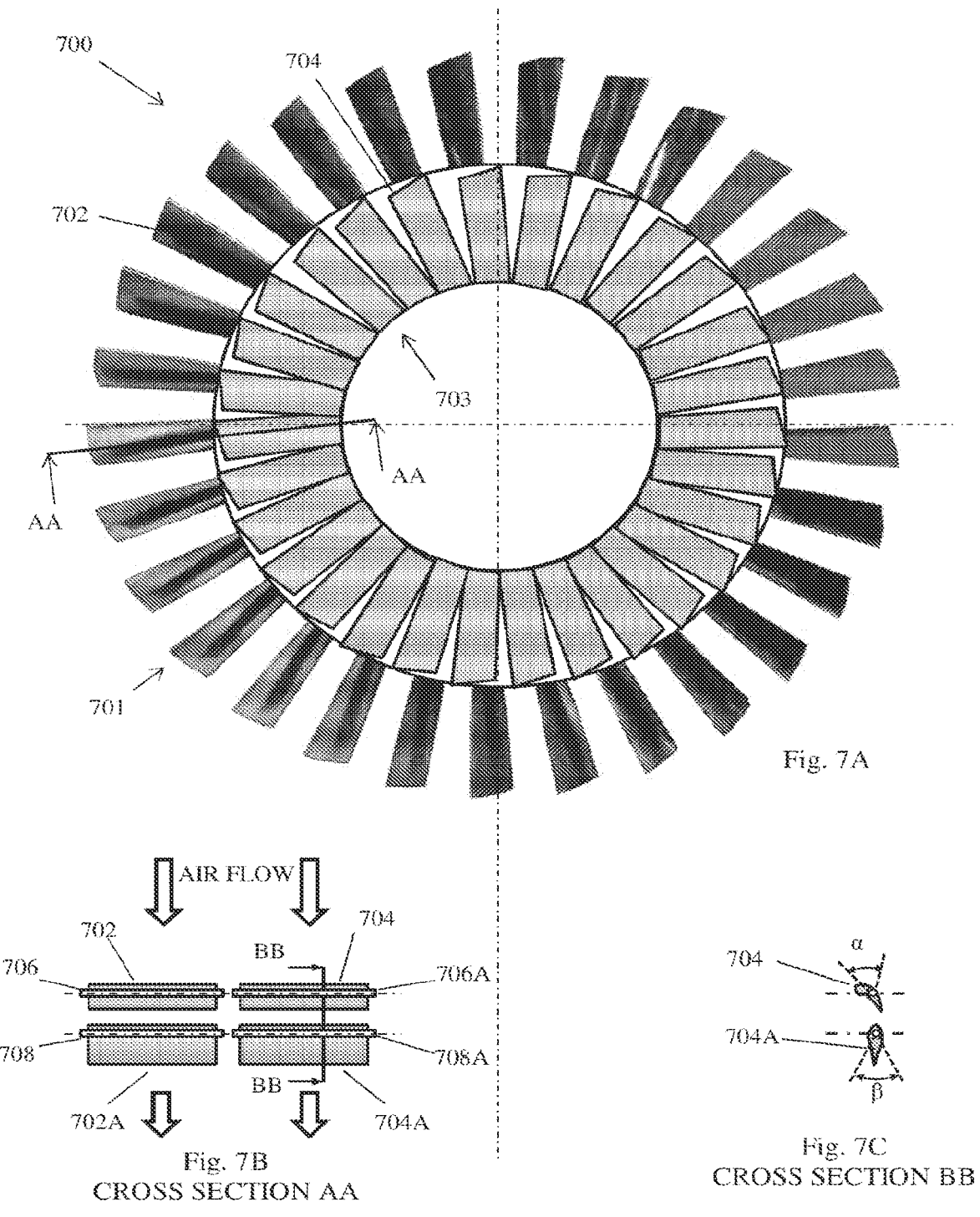
FIGS. 7A-7C are schematic illustrations of a coaxial multi-rotors system in top view, in first cross section view and in a second cross section view, respectively, according to embodiments of the present invention.

Reference is made now to FIGS. 7A-7C which are schematic illustrations of coaxial multi-rotors system 700 in top view, in first cross section view and in a second cross section view, respectively, according to embodiments of the present invention. Coaxial multi-rotor system 700 comprises two coaxial rotors 701 and 703, disposed substantially in a common plane wherein the outer radius of inner rotor 703 is slightly shorter than the inner radius of outer rotor 701. Rotor 701 comprises a plurality of rotating blades 702 and stator fins 702A. Rotor 703 comprises a plurality of rotating blades 704 and stator guiding fins 704A. Airflow induced through rotors' blades 702 or 704 due to the rotation of each of the rotors, passes over the respective guiding fins 702A and 704A, respectively. Each of blades 702 and 704 may structurally be connected to the rotors' circumferential support rings via one or more structure means 706 and 706A, respectively. In embodiments of the invention where the angle of attack of the rotors' blades may be controlled, support means 706 and 706A may provide both structural support and means for changing the angle of attack. Change in the angle of attack of the rotors' blades may be required in order to optimize the rotors' performance in changing operation conditions. In some embodiments of the present invention the angle of attack of each of the rotors' blades may be within the range of α expressed, for example, in degrees. In a similar manner air guiding fins 702A and 704A may structurally be supported by at least one support means 708 and 708A, respectively. In embodiments where the angle of attack (or angle of air flow directing) is controllable support means 708 and 708A may also be used for changing the angle of attack of the stator air guiding fins 702A and 704A. In some embodiments of the present invention the angle of attack of each of the stators' guiding fins may be within the range of β degrees.

Stators disposed downstream of the rotor, as are stators 702A and 704A may be adapted to straighten helical flow coming out of the rotor and make it more linear and thus enable extraction of extended thrust from that flow. Additionally or alternatively guiding fins such as fins 702A and/or 704A may be used to deviate the direction of flow and thereby change the direction of thrust.

Each of the rotors, or propellers, in the multi-rotor systems may be powered, or rotated by means of any known device(s) capable of providing rotational power, such as electrical motor or motors, internal combustion engine and corresponding gearbox(es), turbo-jet engine and corresponding gearbox(es), and the like. When silent operation is of essence electrical motors will be selected, provided that the performance of the electrical power package—electrical power source and the electrical motors—will be sufficient. Sufficiency of the electrical power package may be assessed by the ratio of self-weight to total operational weight of the device using this electrical power package, and/or the service time of the electrical power package between consecutive re-charge cycles, and the like.

Since high figure of total operational weight to selfweight of the power package is of essence Halbach-Array Electrical Motor (HAEM) arrangement may be used to achieve high power with lesser self-weight. Reference is made now to FIGS. 8A-8D, which schematically present various mechanical arrangements 800A-800D respectively, of powering multi-rotor systems using electric motors, for example HAEM arrangements, according to embodiments of the present invention. It will be apparent to those skilled in the art that other powering arrangements may be used for powering similar or identical assemblies of rotors. The various powering solutions for providing rotational drive to the common-axis, different rotor assemblies are designed for example so that the power will be provided to each of the rotors independently to provide maximum redundancy and in a way that power provided to one rotor will incur minimal disturbances to the operation of that rotor and the other rotors (e.g. interference with the air flow to/from the rotors, etc.). Each powering unit is designed to provide the required power, the required rotational speed, the required torque and the required controllability of those parameters.

Figure 8A:
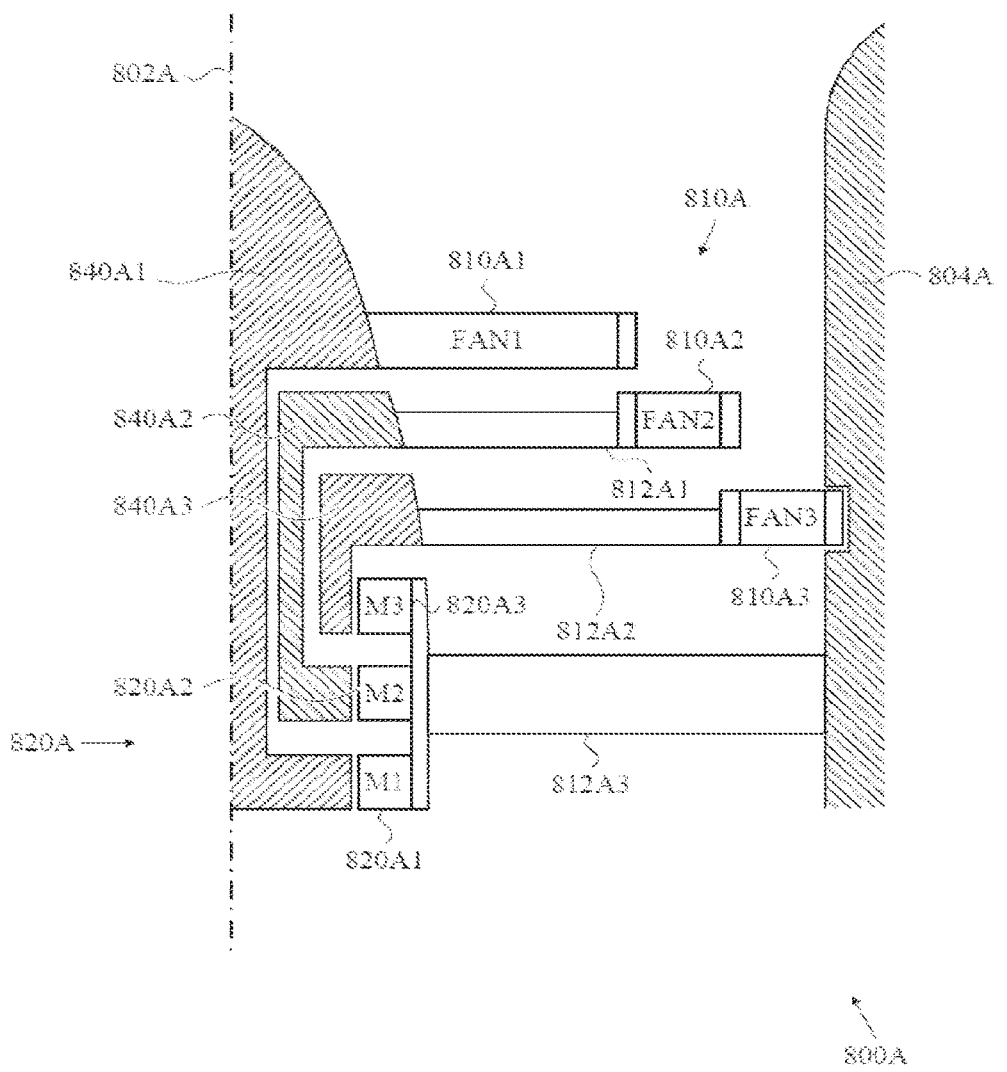
FIGS. 8A-8D schematically present various mechanical arrangements of powering multi-rotor systems using electric motors, according to embodiments of the present invention.

Reference is made now to FIG. 8A, which schematically depicts a multi-rotor system 800A shown in schematic half symmetric cross section, according to embodiment of the present invention. System 800A comprises powering system 820A for providing power to each of the common-axis different rotor length rotor system 810A. Multi-rotor system 800A may comprise two or more common-axis differentrotor-length rotors 810A1, 810A2 and 810A3, arranged one below the other down the flow direction of air through them rotatable about common axis 820A within air duct 804A. First rotor 810A1 may be suspended by shaft 840A1 which may be the innermost shaft. Shaft 840A1 may be driven by motor 820A1 which may be positioned near common axis 802A and lower of motors 820A2 and 820A3 as is described herein below. Second rotor 810A2 may be suspended by suspension assembly 812A1 to second driving shaft 840A2. Suspension assembly 812A1 may be formed as a stator for the air flow from first rotor 810A1, or may be formed as a simple suspension, having minimal drag, and connecting second rotor 810A2 to its respective driving shaft 840A2. Shaft 840A2 may be formed to rotate external to and about inner most shaft 840A1. Second driving shaft 840A2 may be driven by second motor 820A2, which may be positioned near common axis 802A and upper of motor 820A1 and lower of motor 820A3. Similarly, third rotor 810A3 may be suspended by suspension assembly 812A2 to third driving shaft 840A3. Suspension assembly 812A2 may be formed as a stator for the air flow from first rotor 810A and second rotor 810A2, or may be formed as a simple suspension connecting third rotor 810A3 to its respective driving shaft 840A3. Shaft 840A3 may be formed to rotate external to and about shaft 840A2. Third driving shaft 840A3 may be driven by third motor 820A3, which may be positioned near common axis 802A and upper of motors 820A1 820A2 with respect to the direction of air flow. As seen in FIG. 8A all three motors 820A1-820A3 may be positioned nearby common axis 802A and may be suspended by a single suspension assembly 812A3 which attached to air duct 804A. Suspension assembly 812A3 may be formed, according to embodiments of the invention, as a stator to regulate airflow downstream of rotors 810A1-810A3. According to embodiments of the invention two of, or all three motors 820A1-820A3 may be identical thus providing cheaper and simpler driving solution. Additionally, the driving solution of FIG. 8A enables use of small diameter bearings which typically cheaper and having longer life relative to large diameter bearings. The motors structure of FIG. 8A allow for simpler sealing of the motors and shafts, to protect for example against dust and moisture.

In some embodiments more than one duct may be disposed. For example, for rotor 810A1, and/or for rotor 810A2 and/or for rotor 810A3 a separate duct may be provided (not shown in FIG. 8A), thereby regulation of the airflow down stream of rotors 810A1, 810A2 and 810A3 may be improved. In yet additional embodiments the cross section area of each such duct may be changed along the axial direction, e.g, the cross section area of each duct may be reduced downstream of the flow, or—in another embodiment—it may be increased, as the specific intended use may dictate.

Figure 8B:
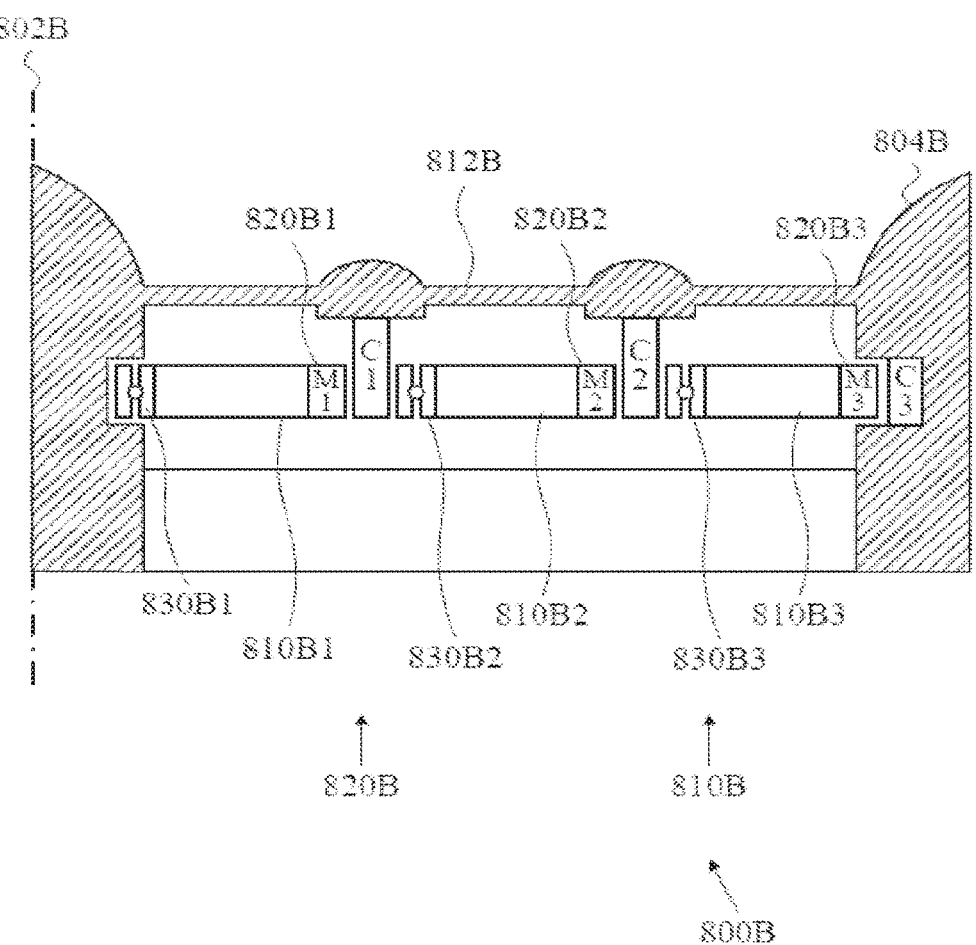

Reference is made now to FIG. 8B, which schematically depicts a multi-rotor system 800B shown in schematic half symmetric cross section, according to embodiment of the present invention. System 800B comprises powering system 820B for providing power to each of the rotors of common-axis different rotor length rotor system 810B. Multi-rotor system 800B may comprise two or more common-axis different-rotor-length rotors 810B1, 810B2 and 810B3, arranged substantially in a common plane perpendicular to the flow direction of air through them and rotatable about common Imaginary axis 802B within air duct 804B. First and inner-most rotor 810B1 may be suspended by first bearing 830B1 which may be installed in the inner portion of air duct 804B, rotor 810B1 may be driven directly by motor 820B1 which may be, for example, a Halbach type electrical motor disposed around the outer circumference of first rotor 810B1. The stator portion of first motor 820B1 that typically contain electric coil, may be suspended by suspension bridge 812B which may also suspend second bearing 830B2, located at the outer circumference of first motor 820B1. Second rotor 810B2 may be suspended by second bearing 830B2 and may be driven by second motor 820B2. Second motor 820B2 may also be, for example, a brushless motor such as for example Halbach type electrical motor disposed around the outer circumference of second rotor 810B2. The stator portion of second motor 820B2 may be suspended by suspension bridge 812B which may also suspend third bearing 830B3, located at the outer circumference of second motor 820B2. Third rotor 810B3 may be suspended by third bearing 830B3 and may be driven by third motor 820B3. Third motor 820B3 may also be, for example, a Halbach type electrical motor disposed around the outer circumference of third rotor 810B3. The stator portion of third motor 820B3 may be suspended by the outer portion of air duct 804B, according to the embodiment depicted in FIG. 8B the bearing of each rotor is located at the smaller dimension of that rotor while the respective motor is located at the outer circumference of that rotor thus capable of providing higher driving moment to its rotor. Additionally, a single and thereby simpler suspension arrangement is required, with minimal interruption by the motors to the air flow and large space left for providing stators if required downstream of the rotors (not shown). The arrangement of FIG. 8B additionally provides compact positioning of the rotors, motors and bearings, thus allowing installation in small available spaces.

Figure 8C:
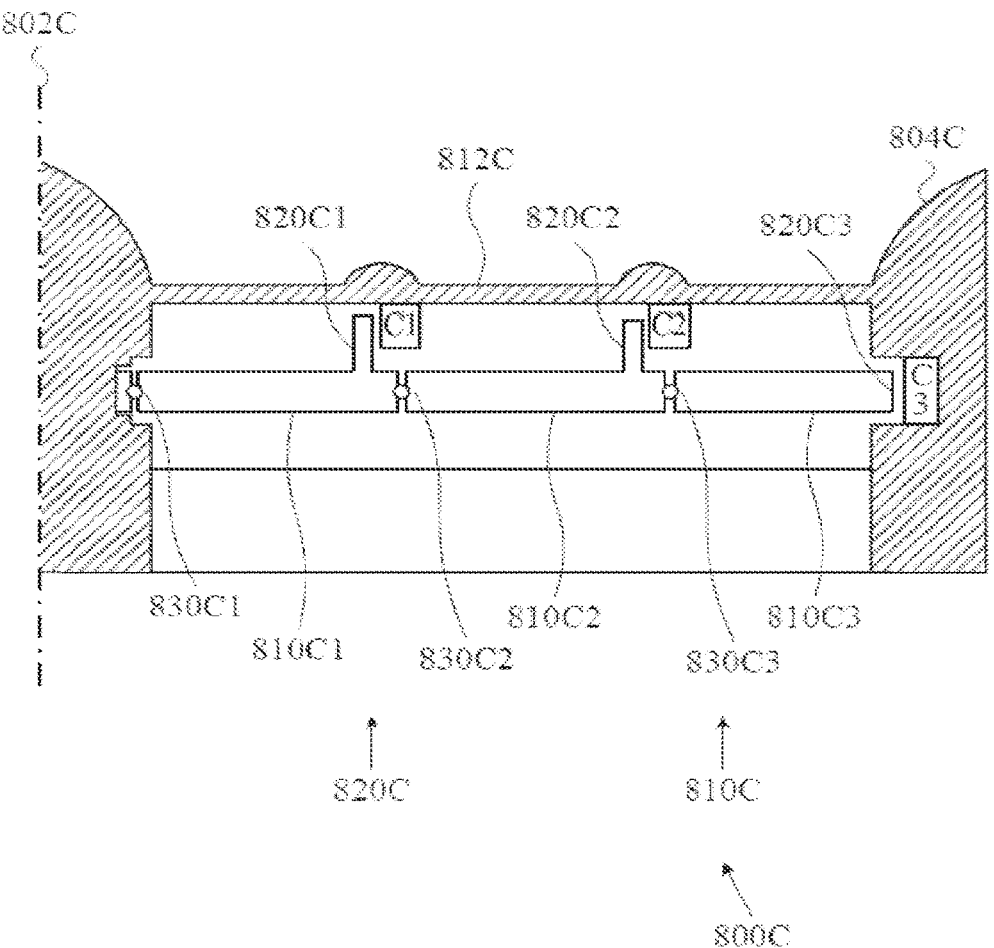

Reference is made now to FIG. 8C, which schematically depicts a multi-rotor system 800C shown in schematic half symmetric cross section, according to embodiment of the present invention. System 800C comprises powering system 820C for providing power to each of the rotors of common-axis different rotor length rotor system 810C. Multi-rotor system 800C may comprise two or more common-axis different-rotor-length rotors 810C1, 810C2 and 810C3, arranged substantially in a common plane perpendicular to the flow direction of air through them and rotatable about common Imaginary axis 802C within air duct 804C. First and inner-most rotor 810C1 may be suspended by first bearing 830C1 which may be installed in the inner portion of air duct 804C. Rotor 810C1 may be driven directly by motor 820C1 which may be, for example, a Halbach type electrical motor the rotating portion of which may be disposed adjacent the outer circumference of first rotor 810C1. The stator portion of first motor 820C1 suspended by suspension bridge 812C. Suspension bridge 812C may extend between the inner portion and the outer portion of air duct 804C, comprising two or more radial elements. Second bearing 830C2 may be disposed around the outer circumference of first rotor 810C1. Second rotor 810C2 may be suspended by second bearing 830C2 and may be driven by second motor 820C2. Second motor 820C2 may also be, for example, a Halbach type electrical motor the rotating portion of which may be disposed adjacent the outer circumference of first rotor 810C2. The stator portion of second motor 820C2 may be suspended by suspension bridge 812C. Third rotor 810C3 may be suspended by third bearing 830C3 and may be driven by third motor 820C3. The inner portion of third bearing 830C3 may be disposed around the outer circumference of second rotor 810C2. Third motor 820C3 may also be, for example, a Halbach type electrical motor the rotating portion of which may be disposed adjacent the outer circumference of third rotor 810C3. The stator portion of third motor 820C3 may be suspended by the outer portion of air duct 804C. According to the embodiment depicted in FIG. 8C the bearing of each rotor is located at the smaller possible dimension of that rotor while the respective motor is located at the outer circumference of that rotor thus capable of providing higher driving moment to its rotor. Additionally, a single and thereby simpler suspension arrangement is required, with minimal interruption by the motors to the air flow and large space left for providing stators if required downstream of the rotors (not shown). The arrangement of FIG. 8C additionally provides compact positioning of the rotors, motors and bearings, thus allowing installation in small available spaces. Further, since bearings 830C2 and 830C3 are installed at their inner ring, on the outer circumference of rotor 810C1 and 810C2, respectively, the actual difference between the rotation speeds of the inner and the outer rings of each of these bearing is merely the difference in the rotational speeds of the respective pairs of rotors 810C1-810C2 and 810C2-810C3 and thereby are subject to reduced wear and long life.

Figure 8D:
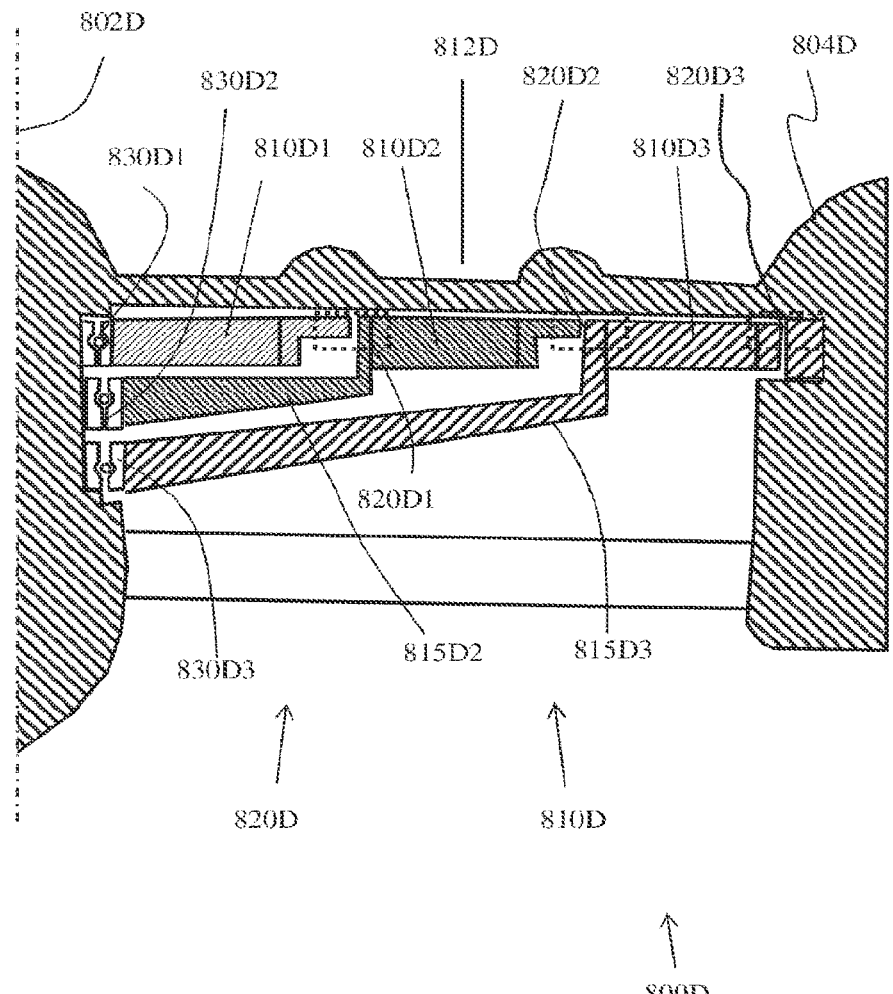

Reference is made now to FIG. 8D, which schematically depicts a multi-rotor system 800D shown in schematic half symmetric cross section, according to embodiment of the present invention. System 800D comprises powering system 820D for providing power to each of the rotors of common-axis different rotor length rotor system 810D. Multi-rotor system 800D may comprise two or more common-axis different-rotor-length rotors 810D1, 810D2 and 810D3, arranged substantially in a common plane perpendicular to the flow direction of air through them and rotatable about common Imaginary axis 802D within air duct 804C. Common-axis different rotor length rotor system 810D may be disposed within air duct 804D. First and inner-most rotor 810D1 may be suspended, via bearing 830D1 directly by the inner portion of air duct 804D. Second rotor 810D2 may be suspended onto bearing 830D2 via two or more suspension arms 815D2, and bearing 830D2 may be disposed similar and adjacent to bearing 830D1 on the inner part of air duct 804D. Third rotor 810D3 may be suspended onto bearing 830D3 via two or more suspension arms 815D3, and bearing 830D3 may be disposed similar and adjacent to bearing 830D1 on the inner part of air duct 804D. First rotor 810D1 may be driven directly by motor 820D1 which may be, for example, a Halbach type electrical motor, the inner rotating portion of which may be disposed adjacent the outer circumference of first rotor 810D1. The outer rotating portion of motor 820D1 may be disposed on the inner circumference of second rotor 810D2. Second rotor 810D2 may be driven directly by motor 820D2 which may be, for example, a Halbach type electrical motor, the inner rotating portion of which may be disposed adjacent the outer circumference of second rotor 810D2. The outer rotating portion of motor 820D2 may be disposed on the inner circumference of second rotor 810D3. Third rotor 810D3 may be driven directly by motor 820D3 which may be, for example, a Halbach type electrical motor, the inner rotating portion of which may be disposed adjacent the outer circumference of third rotor 810D3. The outer portion of motor 820D3 may be disposed on the inner face of the outer portion of air duct 804D. According to the embodiment depicted in FIG. 8D the bearing of all of the rotors are located near the central rotation axis thus enabling use of bearings with small diameter which in turn has technical advantages (easy to install, to protect and seal and reduced wear) as well as commercial advantages (lower cost). At least some of the rotating elements, such as rotors, and suspension arms may be made of light-weight and strong composite materials such as Carbon reinforced Polyether ether ketone (PEEK) or epoxy resin based composite materials. Such non-metallic materials have also the benefit of not presenting disturbances to the magnetic field of the electric motors.

According to embodiments of the invention when low noise produced by a multi-rotor system is of essence electrical motors may be used, as mentioned above with respect to the embodiments depicted in FIGS. 8A-8D. Further, stators and other air guiding means may be used to smooth the air flow to and from the rotors and to minimize turbulences and other air flow induced noises. In other embodiments other driving means may be used such as internal combustion engine(s), turbo-fan jet engines and the like. The selection of the driving means may be done to meet the specific requirements of the multi-rotor system. For example, turbo-fan jet engine driving means may provide improved combination of thrust-to-weight figure combined with time/service range figure, with relatively high noise figure while electrical motors may provide silent driving means with lower thrust-to-net service weight figure and lower time and range service figure.

Figure 9A:
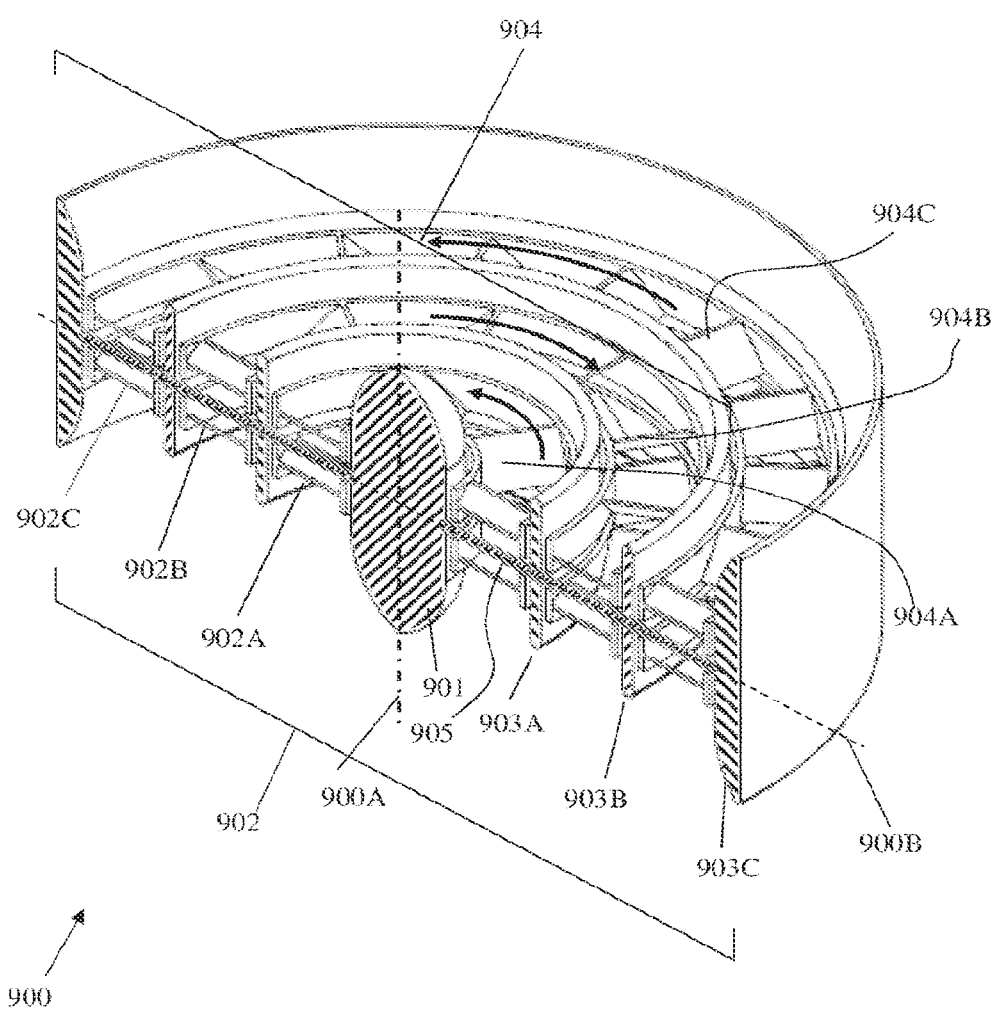
FIGS. 9A and 9B are schematic cross section of an isometric view and a front view of a cross section, respectively, of a multi-rotor system according to embodiments of the present invention.
Figure 9B:
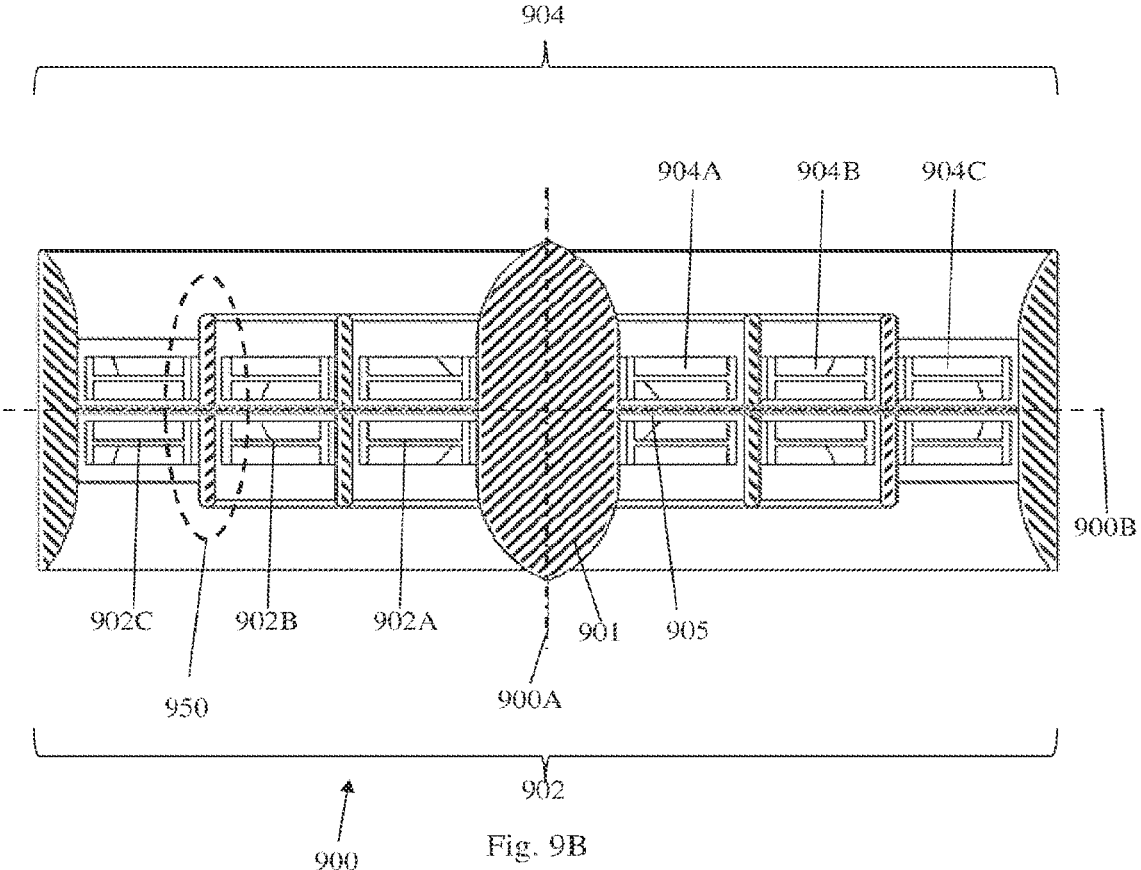

According to some embodiments of the present invention multi-rotor system may comprise plurality of concentric rotors arranged in more than one plane or layers. Reference is made to FIGS. 9A and 9B which are schematic cross section of isometric view and front view of the cross section, respectively, of multi-rotor system 900 according to embodiments of the present invention. Multi-rotor multi-layer system 900 comprise at least two concentric multi-rotor units (CMRU) disposed axially with respect to each other, lower CMRU 902 and upper CMRU 904, arranged about a common rotation axis 900A. Each of CMRU 902 and 904 comprise plurality of substantially co-planar and coaxial rotors disposed radially with respect to each other, three in the example of FIGS. 9A and 9B, rotors 902A-902C in the lower CMRU and rotors 904A-904C in the upper CMRU. Between the outer edges of the blades of each rotor and the inner edges of the blades of the rotor that is external to it, there may be disposed a duct, such as ducts 903A between rotors 902A/902B and rotors 904A/904B, respectively, and the like. Ducts 903A-903C may be structurally supported by radial structure supports 905. Rotors 902A-902C and 904A-904C may be pivotally connected to the structure of multi-rotor system 900 via circumferential bearings and may be powered for rotation by electrical motors such as Halbach-Array Electrical Motor (HAEM), as explained in details above. Each rotor may be rotated by a different motor. Each stator of each motor may be attached to a non-rotating structure, for example the duct or the hub 901. The duct may therefore provide support for a stator of a HAEM on its inner face and support for bearing on its outer face, as explained above, for example with respect to the area of duct 903B marked 950 in FIG. 9B.

Figure 9C:
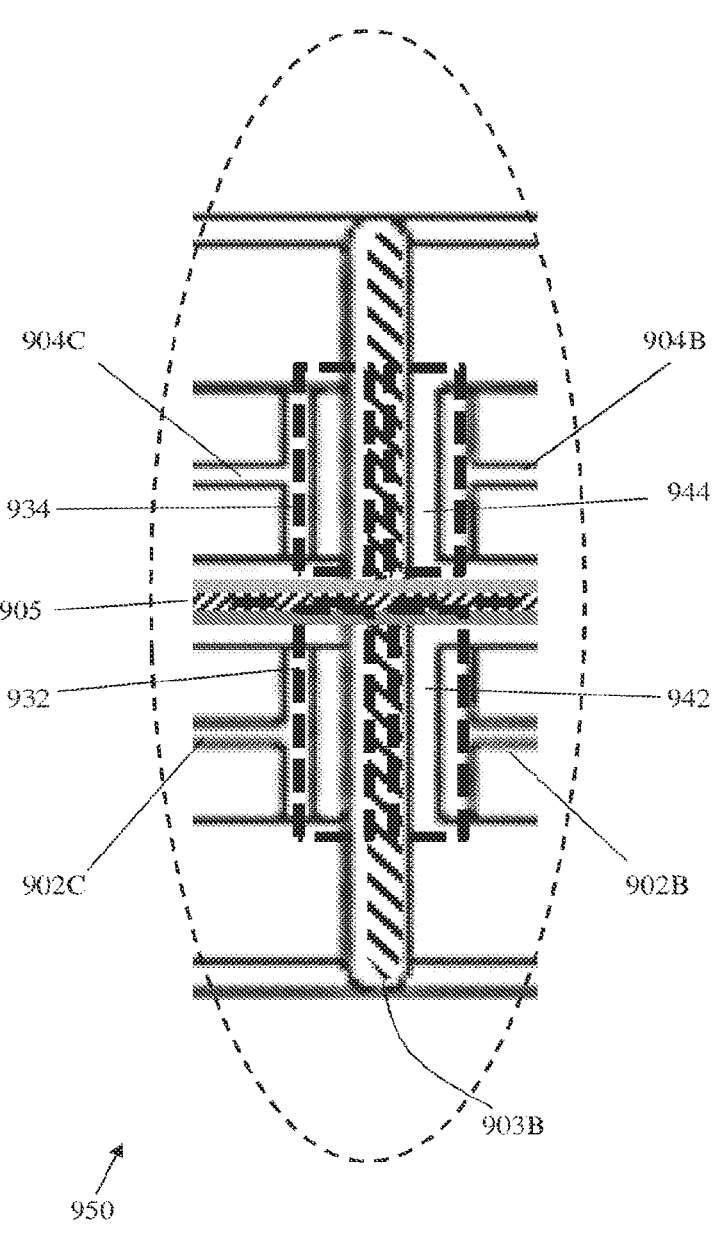
FIG. 9C is an enlarged view of certain details in FIG. 9B according to embodiments of the present invention.

Reference is made to FIG. 9C that is schematically showing enlarged view of details 950 of FIG. 9B, according to embodiments of the present invention. On the right (i.e. inner) side of duct 903B a stator of a HAEM may be disposed in area 942 for powering the set of rotating magnets on rotor 902B and a stator of a HAEM may be disposed in area 944 for powering the set of rotating magnets on rotor 904B. On the left (i.e. outer) side of duct 903B a first (inner) part of a bearing may be disposed in area 932 for providing pivotal support for rotor 902C and a first (inner) part of a bearing may be disposed in area 934 for providing pivotal support for rotor 904C.

According to some embodiments the direction of rotation of each of the rotors in each plane may be CW and CCW alternately, as depicted by the arrows in FIG. 9A. Further, the direction of rotation of pairs of lower and upper rotors may be opposite to each other for maximizing the efficiency of the system.

The arrangement described with respect to FIGS. 9A-9C was found to provide much higher aerodynamic thrust from a given area of rotor compared to a single rotor with the same rotor area.

Selection of the internal and external radius of each of the rotors may be done based on calculations lead by one or more from: substantially same provided power to each rotor, common area for all of the rotors, same received thrust from the rotors and substantially same provided driving moment to each of the rotors.

According to embodiments of the present invention improved redundancy may be achieved with separate rotational power source/driving means for each rotor and separate power control means for each rotor. Alternatively, one control unit and one driving means may be used to drive a single rotor in each multi-rotor system in the vehicle.

According to embodiments of the present invention a plurality of sensors may be provided and disposed with the multi-rotor system. These sensors may be adapted to provide indications of one or more of the following parameters: rotational speed of the rotor, moment provided to the rotor, thrust force produced by each rotor, motors temperature, electric power entering each motor, air flow speed via the rotors, rotor system vibrations (magnitude and frequency) in at least one dimension (and preferably in three linear dimensions and three rotational dimensions) and noise sensor. These physical parameters may be measured or otherwise be sampled or presented to a control unit or for observation by a user by any known means or methods. For example, the rotational speed and rotation direction of the rotor may be measured using measuring means relying on the back EMF phenomena. The moment provided to the rotor may be measured, for example, by measuring the magnitude of axial torque of a shaft used to provide this moment. The deployment of such sensors may be maximal, i.e. sensors to measure or reflect all of the measurable parameters of every rotor in every multi-rotor system, or may be less than that, as may be dictated by the planned usage.

Noise sensor(s) may be used to evaluate the aerodynamic finite efficiency of the mechanical moment-to-air thrust conversion state. It is known that noise stemming from flow turbulences represents, among other aspects, energy invested in causing turbulences in the fluid (e.g. air). Forming turbulences represents energy invested in non-laminar flow, which is the origin for thrust produced in a fluid environment. Thus, reduction of noise representative of flow turbulences is expected to increase the mechanical moment-to-air thrust conversion efficiency figure. In order to reduce flow noise one or more of the following variables may be controlled: rotor rotation speed, rotor blades angle of attack, stator fins angle of attack, shape of the flow (e.g. air) duct, in case it may be controlled (e.g. half cone ("mouse") in the air entry to a jet engine, such in various models of the French Dassault Mirage get airplanes, that is used to control the air flow into the jet engine by means of moving it toward the compressor stages of the engine or away from them within the air intake section.

As depicted by the exemplary embodiments of FIGS. 8A-8D and FIGS. 9A-9B, various configurations of the way the rotors in a multi-rotor system are installed, suspended, being supported by bearings and finally being rotated by rotational power sources are possible. The embodiments where all of the bearings of the rotors are disposed directly on the central axis with relatively small radii are beneficial in the sense that the bearing suspension assembly is simple and relatively cheap yet require suspension solutions for the outer rotors which provide undesired increase in the overall weight and moment of inertia as well as expected disturbances to the multi-rotor overall airflow.

Electrical motors disposed to directly drive the respective external circumference of the rotor have the benefit of being able to provide higher rotational moments with smaller motors (such as Halbach motor) however such driving solutions may cause complications of mechanical installation of the circumferential motors which typically highly sensitive to changes in the working conditions such as the accuracy of the magnetic air gap of the motor, which in such arrangement may be subject to vibrations of the rotor. The Halbach type motor may be disposed with the magnet array disposed on the rotating rotor and the electrical winding may be disposed on the multi-rotor static structure. According to embodiments of the invention the motor air gap may be radial or axial, as may fit the specific need and design. The electric motor used for driving a rotor in the multi-rotor system, whether it is a Halbach type electrical motor, or any other type of electrical motor, may be equipped with electric windings performed using litz wires in order to increase the electrical efficiency as well as reduce the total weight of the copper (or other conductive material) required for providing the electrical power to the motor. Further, in order to enable operating the electrical motor in extended range of provided power, it may be cooled by one or more of the following methods: flowing liquid Nitrogen between the motor's windings and/or around the magnets; and flowing filtered chilled fluid between the windings and/or around the magnets. When Halbach type electrical motor is used, or any other motor having high sensitivity to penetration of contaminants such as dust or snow to its air gap, means for protecting against such penetration may be used, such as enhanced mechanical protective sealing, or use of wipers for removing such contaminants if/when accumulating. Further, in order to minimize mechanical friction at the rotors' bearings common mechanical bearings may be replaced by magnetic bearings.

Electrical motors usable for multi-rotor systems according to embodiments of the present invention may be of variety of types as may be dictated by the selected configuration of the rotor system. As a general rule in order to provide maximal mechanical moment such electrical motors may use, or may comprise of solutions for reduction of inefficiency, for example—reduction of the electrical conduits of the motor using high conductivity conduits (super conductor) made of very low internal resistance materials, operating in super cold environment, etc. It would be apparent to those skilled in the art that certain set of design constrains and requirements imposed on a multi-rotor system typically dictate compromised overall solution considering and addressing the various design requirements as a result of which typically none of the requirement is fully answered but the total performance is expected to be optimal versus the set of requirements.

According to embodiments of the present invention the thrust produced by a multi-rotor system may be designed so that some of the rotors are rotated in one direction, e.g. clockwise and some are rotated in the other direction, e.g. anticlockwise, thereby the total rotational moment acting on the body of the vehicle may be reduced to minimum or even to zero simply by controlling the total thrust produced by the rotors turning in one direction and that produced by rotors turning the other direction of rotation. The ability to control separately the direction of rotation of each rotor in a multi-rotor system and the thrust provided by the rotor (e.g. by changing its angle of attack) may be useful when, for example, one or more rotors in one or more multi-rotor systems fails to properly operate (e.g. it breaks down or its drive breaks down). In such cases it may be possible to disconnect the faulty rotor from its drive and compensate for its absence by re-balancing the direction of rotation and the acquired thrust of each of the remaining rotors.

According to embodiments of the present invention the thrust produced by a multi-rotor system may be decreased in order to decrease the noise produced by the multi-rotor system, for example in order to decrease the undesired impact of this noise in an urban area. Decrease of the thrust may be achieved by one or more of the following means: reduction of the rotation speed of one or more of the rotors, adjustment of the rotors' angles of attack so as to decrease the produced noise, adjustment of the angle of the stators, etc.

According to embodiments of the present invention, a multi-rotor system of the present invention, when used for providing horizontal thrust, may be manipulated to provide reversing thrust for example for stopping forward movement or for providing reverse movement with respect to a forward reference movement.

According to embodiments of the present invention one or more multi-rotor systems of the invention may be used in vehicles capable of moving over land, over sea/water pond and/or in air or in any combination of these environments. Multi-rotor systems of the present invention may also be used in manned or in unmanned vehicles.

According to embodiments of the present invention multi-rotor systems of the invention may be used for flowing fluids, such as air, gaseous and/or liquids and such fluids which comprise solid particles in them, such as fans, blowers or pumps.

According to embodiments of the present invention rotors in multi-rotor systems of the invention may be disposed about a common axis so as to provide thrust in a common axial direction and the rotors may be disposed shifted axially with respect to each-other.

According to embodiments of the present invention multi-rotor systems may be rotated by electrical motor that engages its respective rotor via the external radius of the rotor or via the internal radius of the rotor. Electrical motor engaging the rotor via its external radius may provide higher moment with less electrical current.

According to embodiments of the present invention power to energize the electrical motors may be provided from one or more of the following electrical power sources: batteries: fuel cells: fuel that energizes a generator, solar cells and nuclear reactor.

Figure 10A:
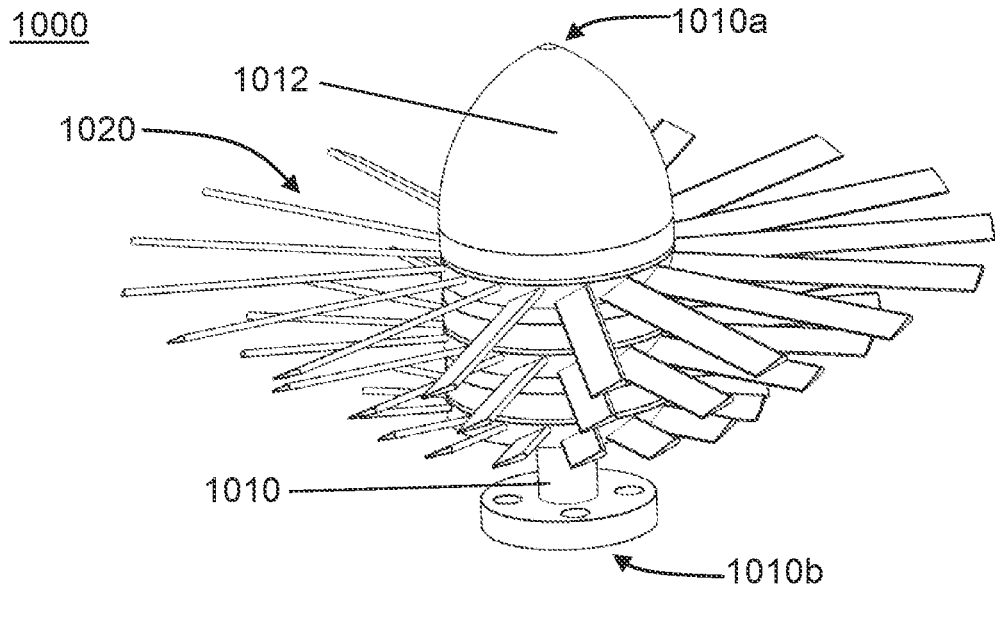
FIGS. 10A, 10B and 10C are schematic illustrations of a multi-rotor system including two or more rotors whose blades have the same inner radius and different outer radiuses, according to some embodiments of the invention.
Figure 10B:
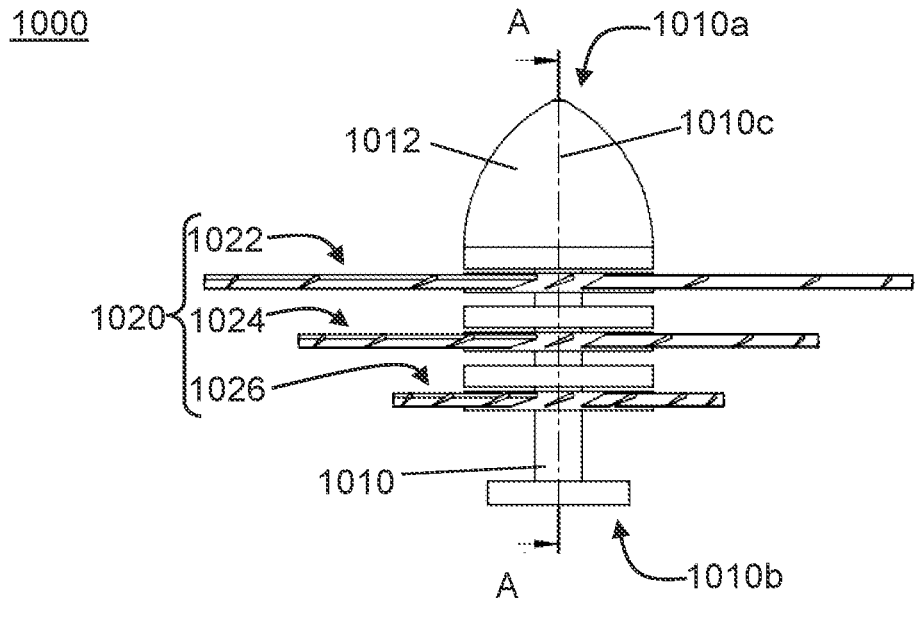
Figure 10C:
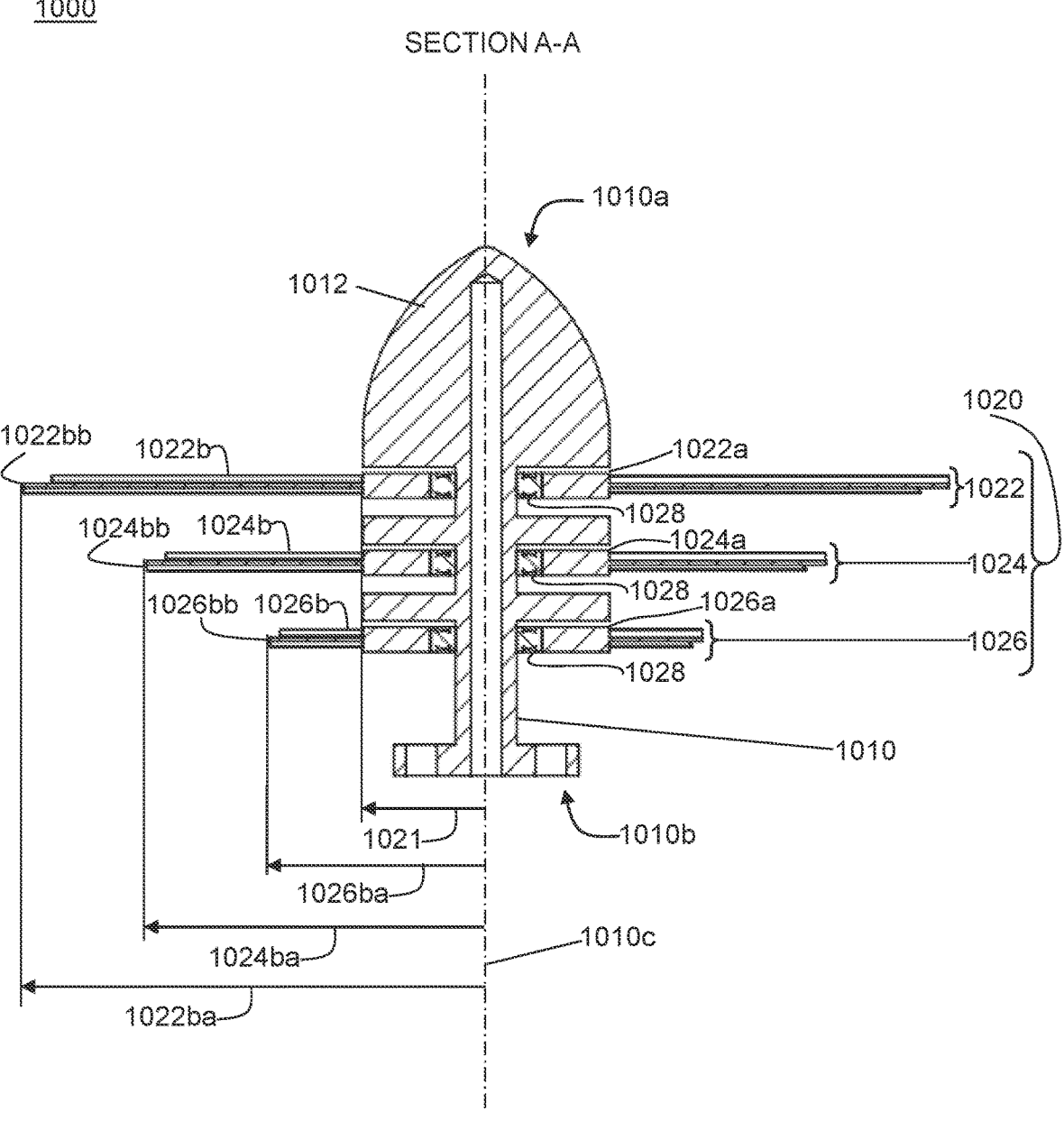

Reference is made to FIGS. 10A, 10B and 10C, which are schematic illustrations of a multi-rotor system 1000 including two or more rotors 1020 whose blades have the same inner radius and different outer radiuses, according to some embodiments of the invention.

FIG. 10A shows a perspective view of multi-rotor system 1000. FIG. 10B shows a side view of multi-rotor system 1000. FIG. 10C shows a cross-sectional view of multi-rotor system 1000 along line AA of FIG. 10B.

Multi-rotor system 1000 may include a shaft 1010 and at least two rotors 1020 coupled to shaft 1010. In the example of FIGS. 10A-10C, multi-rotors system 1000 includes three rotors 1020: a first rotor 1022, a second rotor 1024 and a third rotor 1026. However, multi-rotors system 1000 may include two rotors only (e.g., first rotor 1022 and second rotor 1024) or any other number of rotors (e.g., four rotors, five rotors or more than five rotors).

Shaft 1010 may have a first (e.g., upstream) end 1010a and a second (e.g., downstream) end 1010b. Shaft 1010 may include a spinner 1012 at first (e.g., upstream) end 1010a of shaft 1010 (e.g., first end 1010a may be shaped as spinner 1012). In the example of FIGS. 10A-10C, spinner 1012 is stationary (e.g., not rotatable) with respect to shaft 1010. In another example, spinner 1012 may be rotatable about shaft 1010 (e.g., spinner 1012 may be rotatably coupled to for example rotor 1022). Spinner 1012 may be a conical or dome-shaped structure that may streamline the airflow and improve aerodynamic efficiency of multi-rotors system 1000.

Rotors 1020 may be concentric with respect to each other. Rotors 1020 may be coaxial with shaft 1010. Rotors 1020 may be coaxial with a central longitudinal axis 1010c of shaft 1010. Rotors 1020 may be disposed axially with respect to each other along shaft 1010. Each of rotors 1020 may be disposed at its respective position along shaft 1010 that is different from positions of other rotors 1020 along shaft 1010. Rotors 1020 may be disposed in different planes.

Rotors 1020 may be rotatably coupled to shaft 1010. Rotors 1020 may rotate about shaft 1010. Rotors 1020 may be coupled to shaft 1010 using bearings 1028 which may support rotors 1020 along shaft 1010 and allow the rotation of rotors 1020 about shaft 1010.

Blades of all rotors 1020 may have the same inner radius (e.g., measured from central longitudinal axis 1010c of shaft 1010). Blades of different rotors 1020 may have different outer radiuses (e.g., measured from central longitudinal axis 1010c of shaft 1010).

In the example of FIGS. 10A-10C, first rotor 1022 includes a base member 1022a rotatably coupled to shaft 1010 using bearing 1028 and a plurality of blades 1022b extending radially from base member 1022a. Base member 1022a may have circular (or substantially circular) shape. Blades 1022b may be evenly placed along the circumference of base member 1022a. Each of blades 1022b of first rotor 1022 may have an inner radius 1021 (e.g., measured from central longitudinal axis 1010c of shaft 1010). Each of blades 1022b of first rotor 1022 may have an outer radius 1022ba (e.g., measured between central longitudinal axis 1010c of shaft 1010 and a tip 1022bb of respective blade 1022b).

In the example of FIGS. 10A-10C, second rotor 1024 includes a base member 1024a (e.g., such as base member 1022a) rotatably coupled to shaft 1010 using bearing 1028 and a plurality of blades 1024b extending radially from base member 1024a. Blades 1024b may be evenly placed along the circumference of base member 1024a. Each of blades 1024b of second rotor 1024 may have inner radius 1021 (e.g., the same inner radius as blades 1022b of first rotor 1022). Each of blades 1024b of second rotor 1024 may have an outer radius 1024ba (e.g., measured between central longitudinal axis 1010c of shaft 1010 and a tip 1024bb of respective blade 1024b). Outer radius 1024ba of blades 1024b of second rotor 1024 may be smaller than outer radius 1022ba of blades 1022b of first rotor 1022.

In the example of FIGS. 10A-10C, third rotor 1026 includes a base member 1026a (e.g., such as base members 1022a, 1024a) rotatably coupled to shaft 1010 using bearing 1028 and a plurality of blades 1026b extending radially from base member 1026a. Blades 1026b may be evenly placed along the circumference of base member 1026a. Each of blades 1026b of third rotor 1026 may have inner radius 1021 (e.g., the same inner radius as blades 1022b of first rotor 1022 and as blades 1024b of second rotor 1024). Each of blades 1026b of third rotor 1026 may have an outer radius 1026ba (e.g., measured between central longitudinal axis 1010c of shaft 1010 and a tip 1026bb of respective blade 1026). Outer radius 1026ba of blades 1026b of third rotor 1026 may be smaller than outer radius 1024ba of blades 1024b of second rotor 1024.

In the example of FIGS. 10A-10C, first rotor 1022 having blades 1022b of the greatest outer radius 1022ba of rotors 1020 is disposed closer to first (e.g., upstream) end 1010a of shaft 1010 or spinner 112 than other rotors 1020, third rotor 1026 having blades 1026b of the smallest outer radius 1026ba of rotors 1020 is disposed closer to second (e.g., downstream) end 1010b of shaft 1010 than other rotors 1020, and second rotor 1024 is disposed between first rotor 1022 and third rotor 1026. In another example, third rotor 1026 having blades 1026b of the smallest outer radius 1026ba of rotors 1020 may be disposed closer to first (e.g., upstream) end 1010a of shaft 1010 or spinner 112 than other rotors 1020, first rotor 1022 having blades 1022b of the greatest outer radius 1022ba of rotors 1020 may be disposed closer to second (e.g., downstream) end 1010b of shaft 1010 than other rotors 1020, and second rotor 1024 is disposed between first rotor 1022 and third rotor 1026. However, since the most outer portion of the radius of each rotor of rotors 1020 is the most efficient (e.g., as described hereinabove), the flow from the most outer rotor should not be interrupted by other rotors (or at least such interruption should be minimized). Accordingly, the configuration of rotors 1020 as in the example of FIGS. 10A-10C may have higher efficiency than other possible configurations.

Multi-rotors system 1000 may include driving means to drive rotors 1020 and/or control operation of rotors 1020. For example, multi-rotors system 1000 may include at least two motors, e.g. one motor for each rotor of at least two rotors 1020. The at least two motors may drive rotors 1020 to cause rotors 1020 to rotate about shaft 1010. Examples of different motors for multi-rotor system 1000 are described hereinbelow.

Rotors 1020 may be rotatable (e.g., rotated by motors) at different angular velocities. The angular velocities of rotors 1020 may be set (e.g., by motors and/or controllers that control the motors) so as to cause the tips of the blades of all rotors 1022 to rotate at the same tangential speed (e.g., as described hereinabove for example with respect to FIGS. 2A-2B). The target tangential speed of the tips of the blades of rotors 1022 may be the maximal practical tangential speed for the predefined operation profile of multi-rotor system 1000 (e.g., as described hereinabove for example with respect to FIGS. 2A-2B).

In the example of FIGS. 10A-10C, the angular speed of third rotor 1026 may be greater that the angular speed of second rotor 1024 and the angular speed of second rotor 1024 may be greater than the angular speed of first rotor 1022 so as to cause tips 1026bb of blades 1026b of third rotor 1026, tips 1024bb of blades 1024b of second rotor 1024 and tips 1022bb of blades 1022b of first rotor 1022 to rotate at the same tangential speed. The angular speeds of different rotors 1020 may be proportional to the tip radius of each of rotors 1020. For example, the shorter the tip radius of the rotor, the higher the angular velocity of the respective rotor should be to achieve the target tangential speed of the tip of the respective rotor.

In one example, rotors 1020 may rotate in the same direction (e.g., as described hereinabove). Rotation of rotors 1020 in the same direction may cause less air turbulence and less noise than if different rotors 1020 would have been rotated in different directions. In another example, at least some rotors of rotors 1020 may rotate in a first direction and other rotors of rotors 1020 may rotate in a second direction that is opposite to the first direction (e.g., as described hereinabove). Rotation of rotors 1020 in different directions may reduce the total rotational moment acting on multi-rotor system 1000 to minimum or even to zero. For example, in an airborne vehicle including four multi-rotor systems 1000, all rotors of two of four multi-rotor systems 1000 may rotate in the first direction and other two of four multi-rotor systems 1000 may rotate in the second direction to reduce the total rotational moment acting on the airborne vehicle to minimum or even to zero.

It shall be apparent that in some embodiments the specific angular speeds of rotors 1020 of multi-rotor system 1000 may be set otherwise, for example so as to incur the tangential speed of the tips of the blades to vary between rotors 1020, for example as the functionality of multi-rotor system 1000 may dictate (e.g., as described hereinabove). In the case of malfunction in one or rotors 1020, other rotors of rotors 1020 may be rotated at higher angular speeds to compensate for the malfunctioned rotor (e.g., as described hereinabove).

In the example of FIGS. 10A-10C, all rotors 1020 include the same number of blades (e.g., sixteen blades). In another example, at least some rotors 1020 may include a number of blades that is different from the number of blades of other rotors of rotors 1020. In the example of FIGS. 10A-10C, the blades of all rotors 1020 have the same geometry (e.g., the same chord, the same pitch, the same foil profile and the same thickness distribution). In another example, the geometry of the blades of at least some rotors of rotors 1020 may be different from the geometry of the blades of other rotors of rotors 1020. The number and/or the geometry of the blades of each rotor of rotors 1020 may be selected (e.g., based on the target tangential speed of each segment of the blades of the respective rotor) to achieve optimal aerodynamic efficiency from multi-rotor system 1000 and/or to achieve minimal level of noise from multi-rotor system 1000.

Spinner 1012 may include or accommodate components of multi-rotor system 1000 such as controllers, batteries, heatsinks or any other components of multi-rotor system 1000.

In various embodiments, multi-rotor system 1000 may include a protective cover net. In one example, the protective cover net may be a planar net disposed upstream of rotors 1020. In another example, the protective cover net may be a three-dimensional structure that may at least partly surround rotors 1020.

Multi-rotor system 1000 may be used to provide a vertical thrust (e.g., as described hereinabove). Multi-rotor system 1000 may be used to provide a horizontal thrust (e.g., as described hereinabove).

Multi-rotor system 1000 may be a tilt-multirotor system that may be tilted between different positions to provide vertical thrust during takeoff and landing and horizontal thrust during horizontal flight. In some embodiments, the blades of at least one of rotors 1020 may have variable or adjustable pitch. Variable or adjustable pitch may allow selecting the optimal pitch for different air intake velocities (e.g., one pitch angle for low air intake velocities during vertical takeoff or landing and another pitch angle for high air intake velocities during horizontal flight).

Some embodiment of the present invention may provide an airborne vehicle adapted to perform vertical takeoff and landing (VTOL), which may include at least two multi-rotor systems 1000. In some embodiments, at least one of multi-rotor systems 1000 may provide mainly vertical thrust, for example when in takeoff and in landing maneuvering (e.g., as described hereinabove). In some embodiments, at least one of multi-rotor systems 1000 may provide mainly horizontal thrust, for example when in flight maneuvering (e.g., as described hereinabove).

Figure 10D:
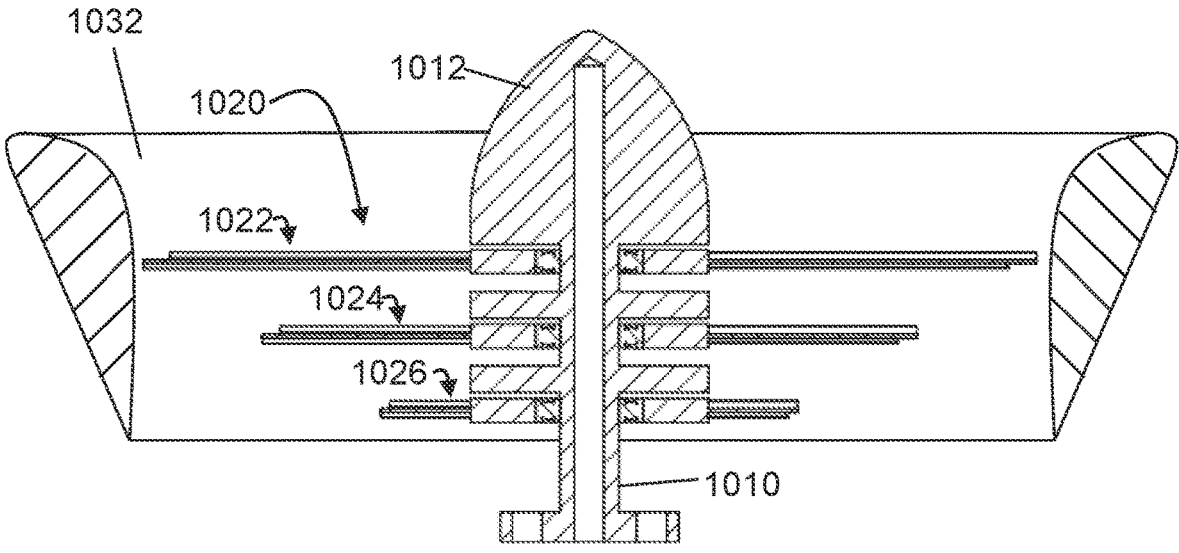
FIG. 10D is a schematic illustration of multi-rotor system of FIG. 10C further including a duct, according to some embodiments of the invention.

Reference is made to FIG. 10D, which is a schematic illustration of multi-rotor system 1000 of FIG. 10C further including a duct 1032, according to some embodiments of the invention.

FIG. 10D shows the cross-sectional view of multi-rotor system 1000 along line AA of FIG. 10B.

Multi-rotor system 1000 may include at least one duct disposed around at least one rotor of the at least two rotors 1020. In the example of FIG. 10D, multi-rotor system 1000 include a duct 1032 disposed around first rotor 1022. However, multi-rotor system 1000 may include more than one duct. For example, multi-rotor system 1000 may include three ducts (such as duct 1032), wherein each of the three ducts may be disposed around one of rotors 1020.

Figure 11A:
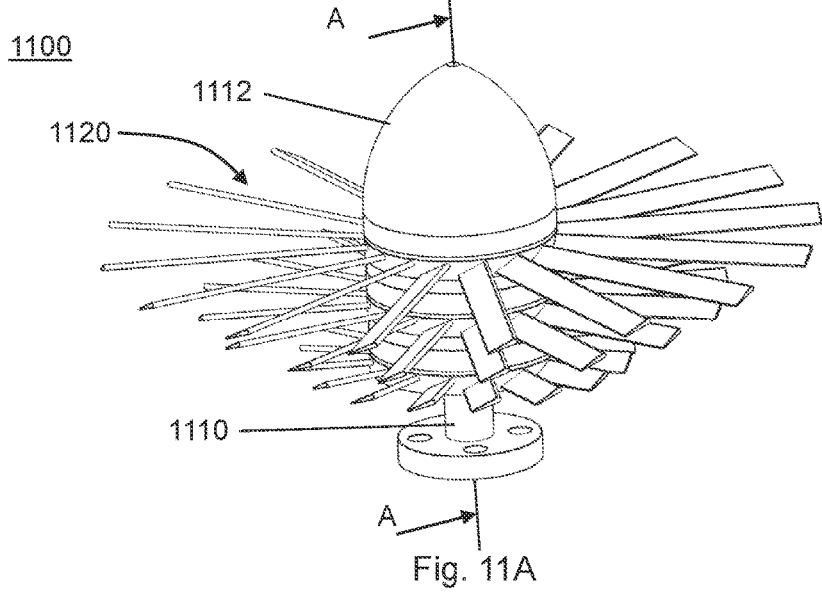
FIGS. 11A and 11B are schematic illustrations of a multi-rotor system including two or more rotors and two or more axial flux electric motors for driving the rotors, according to some embodiments of the invention.
Figure 11B:
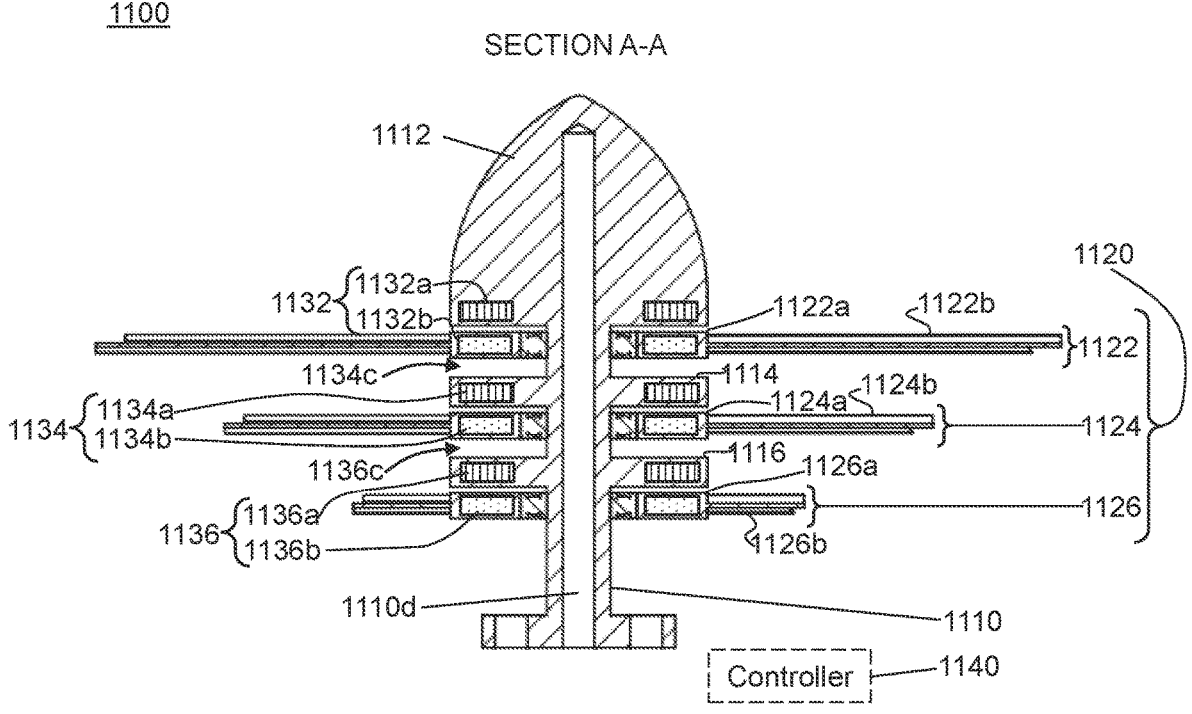

Reference is made to FIGS. 11A and 11B, which are schematic illustrations of a multi-rotor system 1100 including two or more rotors 1120 and two or more axial flux electric motors for driving rotors 1120, according to some embodiments of the invention.

FIG. 11A shows a perspective view of multi-rotor system 1100. FIG. 11B shows a cross-sectional view of multi-rotor system 1100 along line AA of FIG. 11A.

In the example of FIGS. 11A-11B, multi-rotor system 1100 (e.g., such as multi-rotor system 1000) includes a shaft 1110 (e.g., such as shaft 1010 described hereinabove) and three rotors 1120 (e.g., such as rotors 1020 described hereinabove): a first rotor 1122 (e.g., such as first rotor 1022 described hereinabove), a second rotor 1124 (e.g., such as second rotor 1022 described hereinabove) and a third rotor 1126 (e.g., such as third rotor 1026 described hereinabove).

Multi-rotor system 1100 may include at least two motors (e.g., electric motors) to drive rotors 1120. The at least two motors may be, for example, ironless brushless (e.g., coreless or slotless) motors. Such motors may, for example, have lower cogging, lower torque ripple, lower noise and lower vibrations than other motors known in the art. In the example of FIGS. 11A and 11B, multi-rotor system 1100 includes three axial flux electric motors: a first axial flux electric motor 1132 (e.g., also referred herein as first motor 1132), a second axial flux electric motor 1134 (e.g., also referred herein as second motor 1134) and a third axial flux electric motor 1136 (e.g., also referred herein as third motor 1134).

In the example of FIGS. 11A-11B, first motor 1132 drives first rotor 1122. First motor 1132 may include a stator 1132a and a rotor 1132b. Stator 1132a may include an electromagnetic coil that may generate a magnetic field when an electric current is passing through the coil. Stator 1132a may be attached to shaft 1110 or a spinner 1112 (e.g., such as spinner 1012 described hereinabove) or embedded in spinner 1112 (as in the example of FIGS. 11A-11B). Rotor 1132b may include plurality of magnets embedded in it. The magnets may create an alternating magnetic field in the direction parallel to axis of rotation of stator 1132a. Rotor 1132b may be attached to or embedded in a base member or hub 1122a (e.g., such as base member 1022a described hereinabove) of first rotor 1122. Stator 1132a and rotor 1132b may be parallel (or substantially parallel) to each other. The magnets of rotor 1132b may generate a magnetic field that may interact with the magnetic field produced by the coils of stator 1132a which may result in the rotation of first rotor 1122 (e.g., rotation of base member 1122a and a plurality of blades 1122b (such as blades 1022b described hereinabove) of second rotor 1024) about shaft 1110.

In the example of FIGS. 11A-11B, second motor 1134 drives second rotor 1124. Second motor 1134 may include a stator 1134a and a rotor 1134b. Stator 1134a may include an electromagnetic coil that may generate a magnetic field when an electric current is passing through the coil. In the example of FIGS. 11A-11B, shaft 1110 includes a first extension (e.g., disc-shaped extension) 1114 extending outwardly from shaft 1110 in a region between second rotor 1124 and first rotor 1122. First extension 1114 may be parallel (or substantially parallel) to a base member or hub 1124a (e.g., such as base member 1024a described hereinabove) of second rotor 1124. Stator 1134a may be attached to or embedded in first extension 1114. Rotor 1132b may include a plurality of magnets embedded in it. The magnets may create an alternating magnetic field in the direction parallel to axis of rotation of the stator 1132a. Rotor 1132b may be attached to or embedded in base member 1124a of second rotor 1124. Stator 1134a and rotor 1134b may be parallel (or substantially parallel) to each other. The magnets of rotor 1134b may generate a magnetic field that may interact with the magnetic field produced by the coils of stator 1134a which may result in the rotation of second rotor 1124 (e.g., rotation of base member 1124a and a plurality of blades 1124b (such as blades 1022b described hereinabove) of second rotor 1124) about shaft 1110. A gap 1134c between first extension 1114 of shaft 1110 and base member 1122a of first rotor 1122 may eliminate (or at least significantly reduce) the interference between the magnetic fields generated by first motor 1132 driving first rotor 1122 and the magnetic fields generated by second motor 1134 driving second rotor 1124.

In the example of FIGS. 11A-11B, third motor 1136 drives third rotor 1126. Third motor 1136 may include a stator 1136a and a rotor 1136b. Stator 1136a may include an electromagnetic coil that may generate a magnetic field when an electric current is passing through the coil. In the example of FIGS. 11A-11B, shaft 1110 includes a second extension (e.g., disc-shaped extension) 1116 extending outwardly from shaft 1110 in a region between third rotor 1126 and second rotor 1124. Second extension 1116 may be parallel (or substantially parallel) to a base member or hub 1126a (e.g., such as base member 1026a described hereinabove) of third rotor 1126. Stator 1134a may be attached to or embedded in second extension 1116. Rotor 1136b may include a plurality magnets embedded in it. The magnets may create an alternating magnetic field in the direction parallel to axis of rotation of stator 1134a. Rotor 1136b may be attached to or embedded in base member 1126a of third rotor 1126. Stator 1136a and rotor 1136b may be parallel (or substantially parallel) to each other. The magnets of rotor 1136b may generate a magnetic field that may interact with the magnetic field produced by the coils of stator 1136a which may result in the rotation of third rotor 1126 (e.g., rotation of base member 1126a and a plurality of blades 1126b (such as blades 1026b described hereinabove) of third rotor 1126) about shaft 1110. A gap 1136c between second extension 1116 of shaft 1110 and base member 1124a of second rotor 1124 may eliminate (or at least significantly reduce) the interference between the magnetic fields generated by second motor 1134 driving second rotor 1124 and the magnetic fields generated by third motor 1136 driving third rotor 1126.

FIGS. 11A-11B show one example of attachment or embedment of components of first motor 1132, second motor 1134 and third motor 1136 to shaft 1110 and rotors 1120. Other configurations of attachment or embedment of components of first motor 1132, second motor 1134 and third motor 1136 to shaft 1110 and rotors 1120 are also possible.

The magnets embedded in rotors 1132b, 1134b, 1136b may each generate a magnetic flux in a direction that is parallel (or substantially parallel) to shaft 1110.

The magnets of rotors 1132b, 1134b, 1136b of first motor 1132, second motor 1132 and third motor 1136, respectively, may be organized in one of: alternating order wherein the north (N) and south (S) poles of the magnets alternate creating a repeating pattern: (ii) Halbach arrangement; or any other suitable arrangement.

Each of first motor 1132, second motor 1134 and third motor 1136 may include a controller that may drive the respective motor based on a field oriented control method or based on any suitable control method suitable for driving electric motors.

Each of first motor 1132, second motor 1134 and third motor 1136 may include an acoustic isolation to reduce the noise generated by the respective motor. For example, the acoustic isolation may include a radial shaft seal positioned to close the air gap between the stator and the rotor of each of motors 1132, 1134, 1136 and/or to close the air around bearings (e.g., such as bearings 1028 described hereinabove).

While described with respect to multi-rotor system 1100, axial flux motors such as motors 1132, 1134, 1136 may be used in any multi-rotor systems described herein such as systems 200, 300, 400, 600, 700, 900, 1000.

Shaft 1110 may include hollow channels (e.g., such as a hollow channel 1110d) through which power supply channels and/or control channels of motors 1132, 1134, 1136 may be routed.

Multi-rotor system 1100 may include a control 1140. Controller 1140 may control operation of motors 1132, 1134, 1136 to control rotation of rotors 1120. For example, controller 1140 may control each of first motor 1132, second motor 1134 and third motor 1136 to rotate first rotor 1122, second rotor 1124 and third rotor 1126, respectively, at different angular speeds so as to cause the tips of the blades of first rotor 1122, second rotor 1124 and third rotor 1126 to rotate at the same tangential velocity (e.g., as described hereinabove). In another example, controller 1140 may control each of first motor 1132, second motor 1134 and third motor 1136 to rotate first rotor 1122, second rotor 1124 and third rotor 1126, respectively, in the same direction (e.g., as described hereinabove). Controller 1140 may control each of first motor 1132, second motor 1134 and third motor 1136 to rotate first rotor 1122, second rotor 1124 and third rotor 1126, respectively, according to any other desired operation profile (e.g., as described hereinabove). In various embodiments, controller 1140 may be external to multi-rotor system 1100 or may be included in one or more components of multi-rotor system 1100, for example in spinner 1110. In some embodiments, multi-rotor system 1100 may have no controller and motors 1132, 1134, 1136 may be controlled by an external controller (e.g., a controller of an airborne vehicle that include multi-rotor system 1100).

Figure 12A:
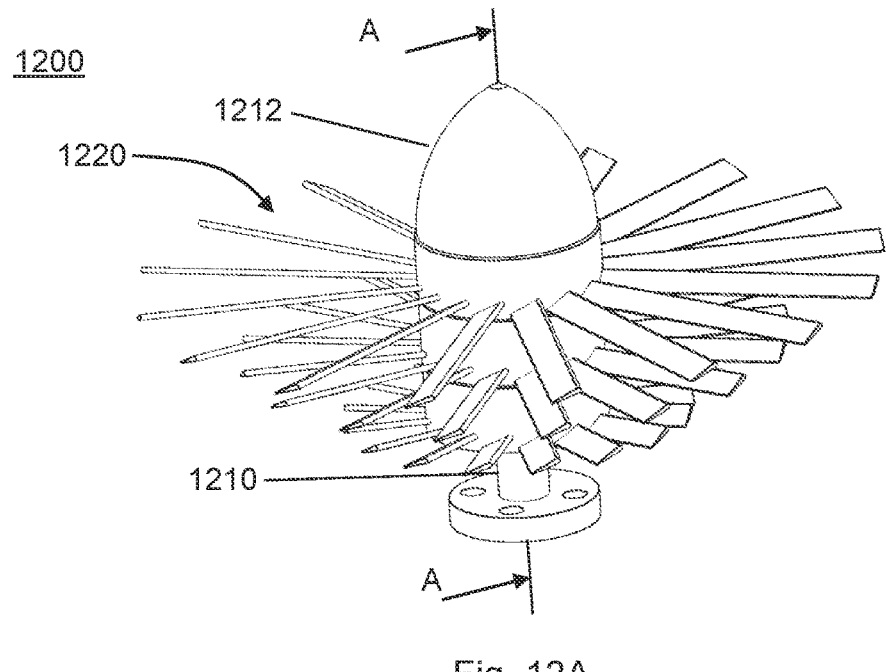
FIGS. 12A and 12B are schematic illustrations of a multi-rotor system including two or more rotors and two or more radial flux electric motors for driving the rotors, according to some embodiments of the invention.
Figure 12B:
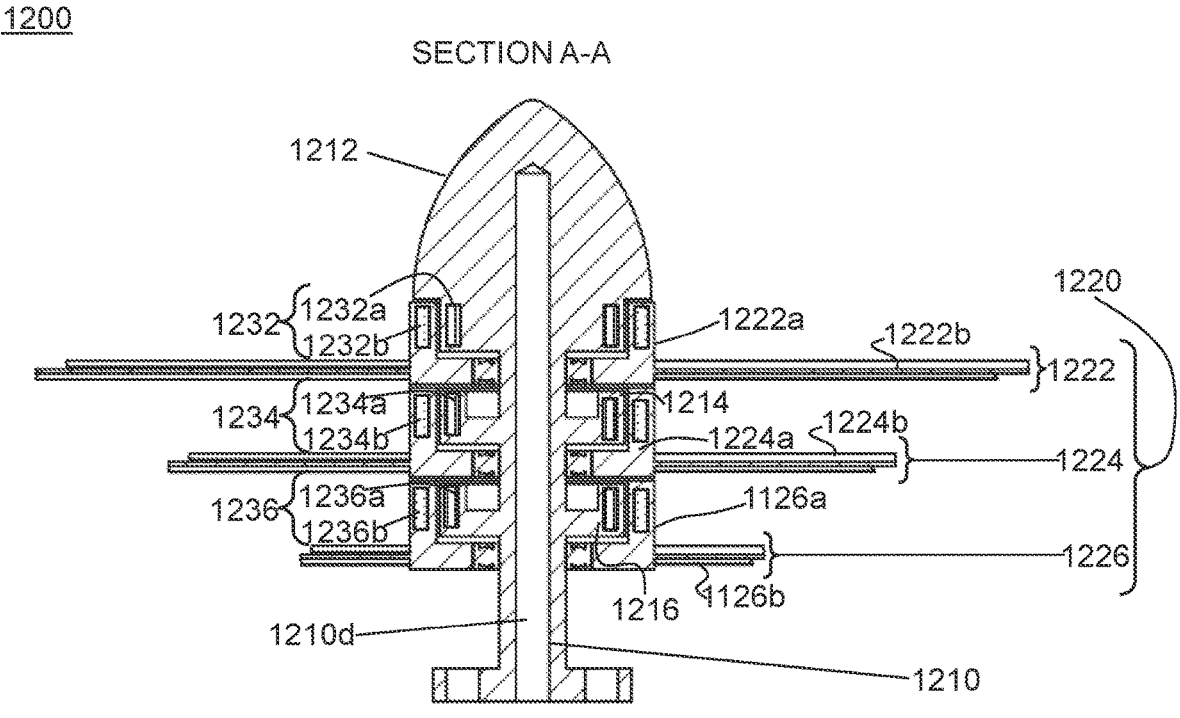

Reference is made to FIGS. 12A and 12B, which are schematic illustrations of a multi-rotor system 1200 including two or more rotors 1220 and two or more radial flux electric motors for driving rotors 1220, according to some embodiments of the invention.

FIG. 12A shows a perspective view of multi-rotor system 1200. FIG. 12B shows a cross-sectional view of multi-rotor system 1200 along line AA of FIG. 12A.

In the example of FIGS. 12A-12B, multi-rotor system 1200 (e.g., such as multi-rotor system 1000) includes a shaft 1210 (e.g., such as shaft 1010 described hereinabove) and three rotors 1220 (e.g., such as rotors 1020 described hereinabove): a first rotor 1222 (e.g., such as first rotor 1022 described hereinabove), a second rotor 1224 (e.g., such as second rotor 1022 described hereinabove) and a third rotor 1226 (e.g., such as third rotor 1026 described hereinabove).

Multi-rotor system 1200 may include at least two motors (e.g., electric motors) to drive rotors 1220. The at least two motors may be, for example, ironless brushless (e.g., coreless or slotless) motors. Such motors may, for example, have lower cogging, lower torque ripple, lower noise and lower vibrations than other motors known in the art. In the example of FIGS. 12A and 12B, multi-rotor system 1200 includes three radial flux electric motors: a first radial flux electric motor 1232 (e.g., also referred herein as first motor 1232), a second radial flux electric motor 1234 (e.g., also referred herein as second motor 1234) and a third radial flux electric motor 1236 (e.g., also referred herein as third motor 1234).

In the example of FIGS. 12A-12B, first motor 1232 drives first rotor 1222. First motor 1232 may include a stator 1232a and a rotor 1232b. Stator 1232a may include a ring-shaped electromagnetic coil that may generate a magnetic field when an electric current is passing through the coil. Stator 1232a may be attached to shaft 1210 or a spinner 1212 (e.g., such as spinner 1012 described hereinabove) or embedded in spinner 1212 (as in the example of FIGS. 12A-12B). Rotor 1232b may include a ring-shaped structure with magnets embedded in it. Rotor 1232b may be attached to or embedded in a base member 1222a (e.g., such as base member 1022a described hereinabove) of first rotor 1222. In the example of FIGS. 12A-12B, a portion of base member 1222a to which rotor 1232b is attached or embedded surrounds a portion of spinner 1212 to which stator 1232a is attached or embedded such that rotor 1232b surrounds stator 1232a of first motor 1232. The magnets of rotor 1232b may generate a magnetic field that may interact with the magnetic field produced by the coils of stator 1232a which may result in the rotation of first rotor 1222 (e.g., rotation of base member 1222a and a plurality of blades 1222b (such as blades 1022b described hereinabove) of second rotor 1024) about shaft 1210.

In the example of FIGS. 12A-12B, second motor 1234 drives second rotor 1224. Second motor 1234 may include a stator 1234a and a rotor 1234b. Stator 1234a may include a ring-shaped coil that may generate a magnetic field when an electric current is passing through the coil. In the example of FIGS. 12A-12B, shaft 1210 includes a first extension (e.g., disc-shaped extension) 1214 extending outwardly from shaft 1210 in a region between second rotor 1224 and first rotor 1222. Stator 1234a may be attached to or embedded in first extension 1214. Rotor 1232b may include a ring-shaped structure with magnets embedded in it. Rotor 1232b may be attached to or embedded in base member 1224a of second rotor 1224. In the example of FIGS. 12A-12B, a portion of base member 1224a to which rotor 1234b is attached or embedded surrounds a portion of first extension 1214 to which stator 1234a is attached or embedded such that rotor 1234b surrounds stator 1234a of second motor 1234. The magnets of rotor 1234b may generate a magnetic field that may interact with the magnetic field produced by the coils of stator 1234a which may result in the rotation of second rotor 1224 (e.g., rotation of base member 1224a and a plurality of blades 1224b (such as blades 1022b described hereinabove) of second rotor 1224) about shaft 1210.

In the example of FIGS. 12A-12B, third motor 1236 drives third rotor 1226. Third motor 1236 may include a stator 1236a and a rotor 1236b. Stator 1236a may include a ring-shaped coil that may generate a magnetic field when an electric current is passing through the coil. In the example of FIGS. 12A-12B, shaft 1210 includes a second extension (e.g., disc-shaped extension) 1216 extending outwardly from shaft 1210 in a region between third rotor 1226 and second rotor 1224. Stator 1234a may be attached to or embedded in second extension 1216. Rotor 1236b may include a ring-shaped structure with magnets embedded in it. Rotor 1236b may be attached to or embedded in base member 1226a of third rotor 1226. In the example of FIGS. 12A-12B, a portion of base member 1226a to which rotor 1236b is attached or embedded surrounds a portion of first extension 1216 to which stator 1236a is attached or embedded such that rotor 1236b surrounds stator 1236a of second motor 1236. The magnets of rotor 1236b may generate a magnetic field that may interact with the magnetic field produced by the coils of stator 1236a which may result in the rotation of third rotor 1226 (e.g., rotation of base member 1226a and a plurality of blades 1226b (such as blades 1026b described hereinabove) of third rotor 1226) about shaft 1210.

FIGS. 12A-12B shown on example of attachment or embedment of components of first motor 1232, second motor 1234 and third motor 1236 to shaft 1210 and rotors 1220. Other configurations of attachment or embedment of components of first motor 1232, second motor 1234 and third motor 1236 to shaft 1210 and rotors 1220 are also possible.

First motor 1232, second motor 1234 and third motor 1236 may each generate a magnetic flux in a direction that is perpendicular (or substantially parallel) to shaft 1210.

The magnets of rotors 1232b, 1234b, 1236b of first motor 1232, second motor 1234 and third motor 1236, respectively, may be organized in one of: alternating order wherein the north (N) and south (S) poles of the magnets alternate creating a repeating pattern: (ii) Halbach arrangement; or any other suitable arrangement.

Shaft 1210 may include hollow channels (e.g., such as a hollow channel 1210d) through which power supply lines and/or control lines of motors 1232, 1234, 1236 may be routed.

Each of first motor 1232, second motor 1234 and third motor 1236 may include a controller that may drive the respective motor based on a field oriented control method or based on any suitable control method suitable for driving electric motors.

Each of first motor 1232, second motor 1234 and third motor 1236 may include an acoustic isolation to reduce the noise generated by the respective motor.

While described with respect to multi-rotor system 1200, radial flux motors such as motors 1232, 1234, 1236 may be used in any multi-rotor systems described herein such as systems 200, 300, 400, 600, 700, 900, 1000.

Multi-rotor system 1200 may include a control (e.g., such as controller 1140 described hereinabove) to control operation of motors 1132, 1134, 1136 so as to control rotation of rotors 1120 according to the desired operation profile (e.g., as described hereinabove).

Figure 13B:
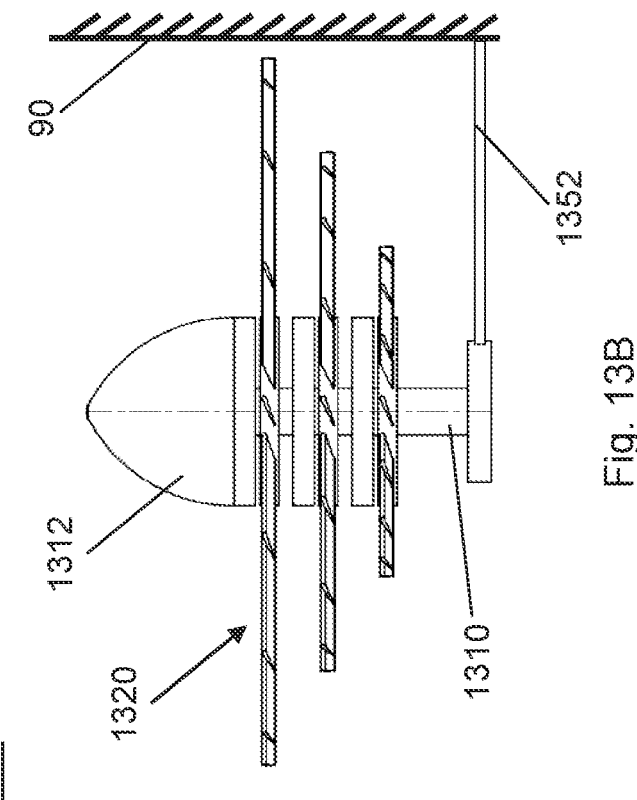
FIGS. 13A and 13B are schematic illustrations of a reference frame and a multi-rotor system coupled to the reference, according to some embodiments of the invention.
Figure 13A:
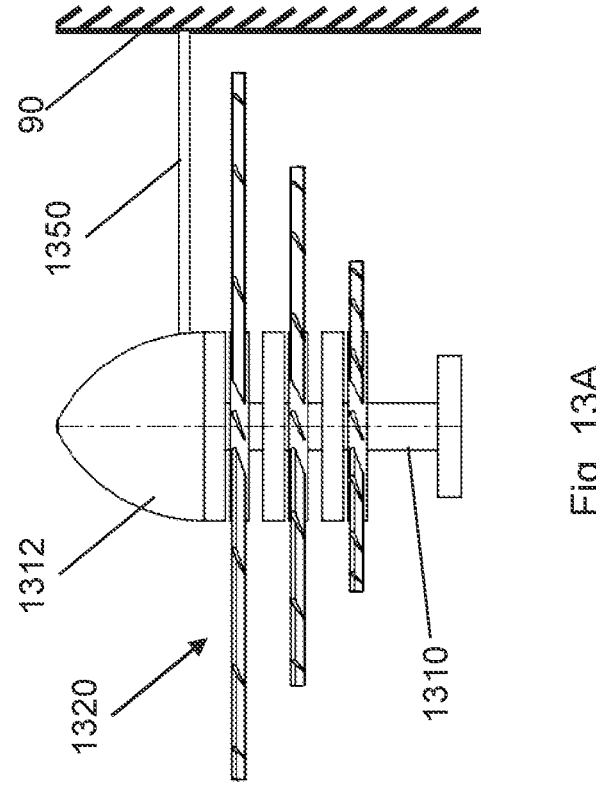

Reference is made to FIGS. 13A and 13B, which are schematic illustrations of a reference frame 90 and a multi-rotor system 1300 coupled to reference 90, according to some embodiments of the invention.

Reference frame 90 schematically indicated in FIGS. 13A-13B may be a chassis or a body of an airborne vehicle or any other device that may include multi-rotor system 1300.

In the example of FIG. 13A, multi-rotor system 1300 includes an upstream connector 1350. Upstream connector 1350 may for example connect a spinner 1312 or any other portion of multi-rotor assembly 1300 disposed upstream of rotors 1320 of multi-rotor assembly 1300 to reference frame 90. In the example of FIG. 13B, multi-rotor system 1300 includes a downstream connector 1352. Downstream connector 1352 may for example connect shaft 1310 or any other portion of multi-rotor assembly 1300 disposed downstream of rotors 1320 of multi-rotor assembly 1300 to reference frame 90. Air speed upstream of rotors 1320 may be smaller than air speed downstream rotors 1320, accordingly, less air vortices will be created to disrupt the flow so it may be advantageously to use upstream connector 1350.

While described with respect to multi-rotor system 1300, such types of connections may be used in any multi-rotor systems described herein such as systems 200, 300, 400, 600, 700, 900, 1000, 1100, 1200.

Multi-rotor systems according to embodiments of the present invention (e.g., such as systems 200, 300, 400, 600, 700, 900, 1000, 1100, 1200) may utilize an area occupied by the multi-rotor system in a more efficient manner than a single rotor system (e.g., as described hereinabove for example with respect to FIGS. 2A-2B and FIGS. 10A-10C). More efficient utilization of the area occupied by the multi-rotor system may allow the multi-rotor system to operate at lower angular velocities and thus at lower tangential rotors' blade tip speeds than single-rotor systems occupying the same area, without compromising on the energy conversion efficiency ratio and/or the thrust.

Experiments show that a multi-rotor system (e.g., such as system 400 described above with respect to FIG. 4) with a first rotor having an inner diameter of 200 mm and an outer diameter of 330 mm and a second rotor having inner diameter of 350 mm and outer diameter of 508 mm each with non optimal uniform 40 mm chord length blades and NACA 4406 profile each operated at a tip speed of 0.15 Mach may provide together thrust of 50.09 N with power consumption of 719 W. This is compared to, for example, a commercial T-MOTOR P60 KV340 with Propeller 20*6CF with single propeller having outer diameter of 508 mm operated at a tip speed of 0.45 Mach, which, according to a test report, provides thrust of 41.91 N with power consumption of 756 W. The experiment shows by using the multi-rotor system according to embodiments of the present invention with a tangential rotors' blade tip velocity that is $\frac{1}{3}$ of the tangential rotor's blade tip velocity of the single-rotor system with the same outer diameter, one can get at least one of: more thrust, less power consumption and less noise. The experiments show that the multi-rotor system operating at tangential rotors' blade tip velocity of 0.1-0.3 Mach may provide the same thrust and the same energy conversion efficiency ratio as the single-rotor system provides for tangential rotors' blade tip velocity of about 0.45 Mach. It is noted that the noise generated by rotors may be proportional to the $4^{th}$ to $6^{th}$ power of tangential rotor's blade tip velocity. Accordingly, reducing the tangential rotors' blade tip velocity of the rotors by the factor of 3 may reduce the noise generated by the rotors by the factor of 81 to 729. Therefore, the multi-rotor system according to embodiments of the present invention may generate significantly less noise than single-rotor systems without compromising on the energy conversion efficiency ratio and/or the thrust. As mentioned above, the experiments were preformed with multi-rotor system having rotors with non optimal uniform 40 mm chord length blades which are very basic blades. Even better results may be achieved by optimizing the geometry of the blades of the rotors of the multi-rotor system.

The noise generated by the rotor may be affected by both the tangential rotors' blade tip velocity and the velocity of the air entering the rotor which is the velocity of the vehicle in the direction of the axis of the rotor. In vertical takeoff and landing the vertical speed is usually low and can be ignored but in horizontal flights the horizontal velocity contribute to the combined air speed that the blade see and it affect the performance of the rotor including the noise. Reynolds number calculated in the tip of the blade can give good indication on the level of the noise of the rotor. For example for blade tip velocity of 0.45 Mach and chord of 40 mm without incoming air flow (i.e. zero flight speed or zero advance ratio) the tip Reynolds number will be 397,680. Reducing the tangential rotors' blade tip velocity of the rotors by the factor of 3 may allow the multi-rotor system to operate in the tip Reynolds numbers of 132,560. By optimizing the blade shape, the tip Reynolds number of less than 200,000 or less than 100,000 can be achieved. In various embodiments, the blade tip Reynolds number is smaller than 200,000 or 100,000.

In some embodiments, the angular speeds of the at least two rotors of the multi-rotor system are set so as to rotate the blade tips of the at least two rotors at a speed of 0.3 Mach or less relative to the air. In some embodiments, the angular speeds of the at least two rotors of the multi-rotor system are set so as to rotate the blade tips of the at least two rotors at the speed of 0.2 Mach or less relative to the air. The speed of 0.3 Mach or less or 0.2 Mach or less may be a magnitude of a velocity vector including the tangential velocity and the linear velocity of the blade tip relative to the air.

The multi-rotor systems according to embodiments of the present invention include two or more rotors, wherein the blades of each of the rotors may be shorter than the blades of the single-rotor system having the same outer diameter. Shorter blades may have greater structural strength than longer blades. Accordingly, the blades of the multi-rotor systems may be thinner and lighter than the blades of the single-rotor system. Also, shorter blades may allow for a small difference in the angle of attack along the length of the blade so that in the case of rotor with variable pitch the blade can be adapted to many work points, for example in both horizontal and vertical flight, with different entry speeds. Furthermore, shorter blades of the multi-rotor systems may have smaller variation of tangential velocity profile along the length of the blade as compared to blades of the single-rotor system, thus allowing greater portions of the blades of the multi-rotor systems to efficiently generate thrust as opposed to blades of the single-rotor system in which only one-third portion of the blades can be efficiently.

The multi-rotor systems according to embodiment of the present invention may be utilized in devices other than airborne vehicles, for example in hair dryers, general blowers for example leaf blowers, vacuum systems for example vacuum cleaners.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items.

The invention is not limited to those diagrams or to the corresponding descriptions. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A multi-rotor system comprising:
at least two concentric rotors rotatable about a common axis and disposed axially with respect to each other;
wherein blades of different rotors of the at least two concentric rotors have the same inner radius and different outer radiuses;
wherein the at least two concentric rotors are rotatable at different angular speeds with respect to each other; and
wherein the angular speeds of the at least two concentric rotors are set so as to rotate blade tips of the at least two rotor rotors at substantially the same tangential speed.

2. The multi-rotor system of claim 1, wherein the tangential speed of the rotor blade tips of the at least two concentric rotors is a maximal practical tangential speed for an operational profile of the multi-rotor system.

3. The multi-rotor system of claim 1, wherein the tangential speed of the blade tips of the at least two rotor rotors relative to the air is 0.2 Mach or less.

4. The multi-rotor system of claim 1, wherein the at least two concentric rotors are rotatable in the same direction.

5. An airborne vehicle adapted to perform vertical takeoff and landing (VTOL), the airborne vehicle comprising at least two multi-rotor systems, each of the at least two multi-rotor systems is according to claim 4.

6. The airborne vehicle of claim 5, wherein at least one multi-rotor system of the at least two multi-rotor systems is adapted to be tilted between a first position in which the at least one multi-rotor system provides mainly horizontal thrust and a second position in which the at least one multi-rotor system provides mainly vertical thrust.

7. The airborne vehicle of claim 5, wherein at least one of the at least two multi-rotor systems is adapted to provide mainly horizontal thrust when in flight maneuvering.

* * * * *